US011294247B2

(12) United States Patent
Tamaki

(10) Patent No.: US 11,294,247 B2
(45) Date of Patent: *Apr. 5, 2022

(54) DISPLAY DEVICE

(71) Applicant: Japan Display Inc., Tokyo (JP)

(72) Inventor: Masaya Tamaki, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/082,090

(22) Filed: Oct. 28, 2020

(65) Prior Publication Data

US 2021/0072583 A1    Mar. 11, 2021

Related U.S. Application Data

(63) Continuation of application No. 16/701,968, filed on Dec. 3, 2019, now Pat. No. 10,852,596, which is a
(Continued)

(30) Foreign Application Priority Data

Jul. 29, 2016 (JP) ................................. 2016-149916

(51) Int. Cl.
*G02F 1/1345* (2006.01)
*G02F 1/133* (2006.01)
(Continued)

(52) U.S. Cl.
CPC ...... *G02F 1/13452* (2013.01); *G02F 1/13306* (2013.01); *G02F 1/13336* (2013.01); *G02F 1/13454* (2013.01); *G02F 1/133345* (2013.01); *G02F 1/133504* (2013.01); *G02F 1/133512* (2013.01); *G02F 1/133514* (2013.01); *G02F 1/134309* (2013.01); *G06F 3/1446* (2013.01); *G09G 3/3648* (2013.01); *G02F 1/133388* (2021.01); *G02F 2201/123* (2013.01);
(Continued)

(58) Field of Classification Search
CPC ........... G02F 1/13452; G02F 1/133504; G02F 1/133388; G02F 2201/123; G02F 1/13306; G09G 2310/0281; G09G 2300/0413; G09G 2310/0232
See application file for complete search history.

(56) References Cited

U.S. PATENT DOCUMENTS 10,852,596 B2 * 12/2020 Tamaki ............ G02F 1/133514
2005/0270449 A1 * 12/2005 Koma ............... G02F 1/133555
349/114
(Continued)

*Primary Examiner* — Jessica M Merlin
(74) *Attorney, Agent, or Firm* — Michael Best & Friedrich LLP

(57) ABSTRACT

According to one embodiment, a display device includes a driver, a pixel circuit disposed to be apart from the driver in a plan view and to be electrically connected to the driver, a first pixel electrode disposed to overlap the pixel circuit in a plan view and to be electrically connected to the pixel circuit, a second pixel electrode disposed to overlap the driver in a plan view and to be closer to an outer edge of a display area than the first pixel electrode, and a relay line disposed between the pixel circuit and the first pixel electrode and between the driver and the second pixel electrode, the relay line electrically connecting the first pixel electrode and the second pixel electrode.

6 Claims, 19 Drawing Sheets

Related U.S. Application Data continuation of application No. 15/656,578, filed on Jul. 21, 2017, now Pat. No. 10,539,843.

(51) Int. Cl.
*G02F 1/1333* (2006.01)
*G02F 1/1335* (2006.01)
*G02F 1/1343* (2006.01)
*G06F 3/14* (2006.01)
*G09G 3/36* (2006.01)

(52) U.S. Cl.
CPC ............ *G09G 2300/026* (2013.01); *G09G 2300/0413* (2013.01); *G09G 2300/0426* (2013.01); *G09G 2310/0232* (2013.01); *G09G 2310/0281* (2013.01)

(56) References Cited

U.S. PATENT DOCUMENTS

| | | | |
|---|---|---|---|
| 2012/0250158 A1* | 10/2012 | Tamaki | G02B 5/0257 359/599 |
| 2014/0253843 A1* | 9/2014 | Kanno | G02B 5/0242 349/62 |
| 2015/0310801 A1* | 10/2015 | Lin | G09G 3/3225 345/205 |

* cited by examiner

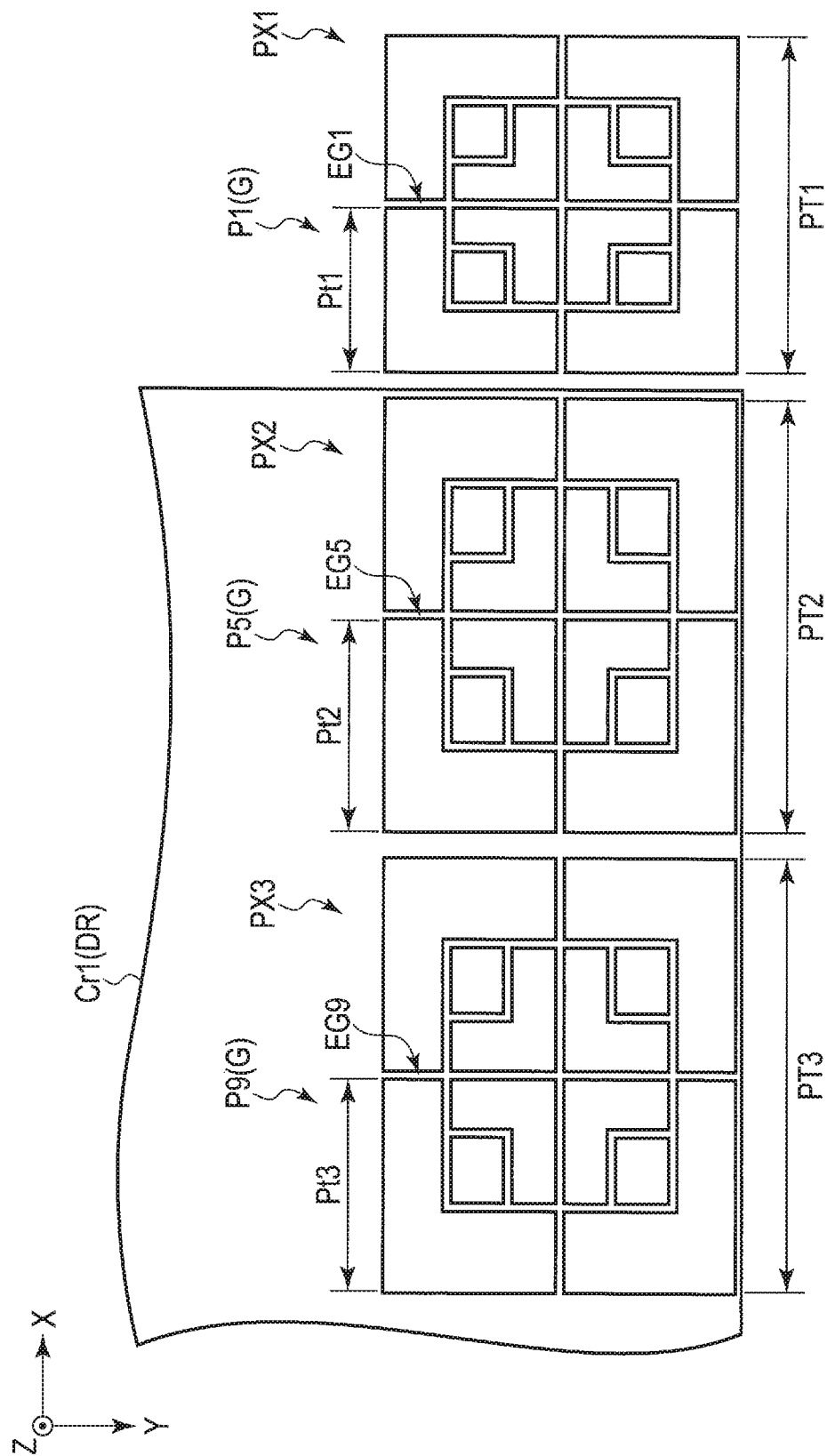
F I G. 20

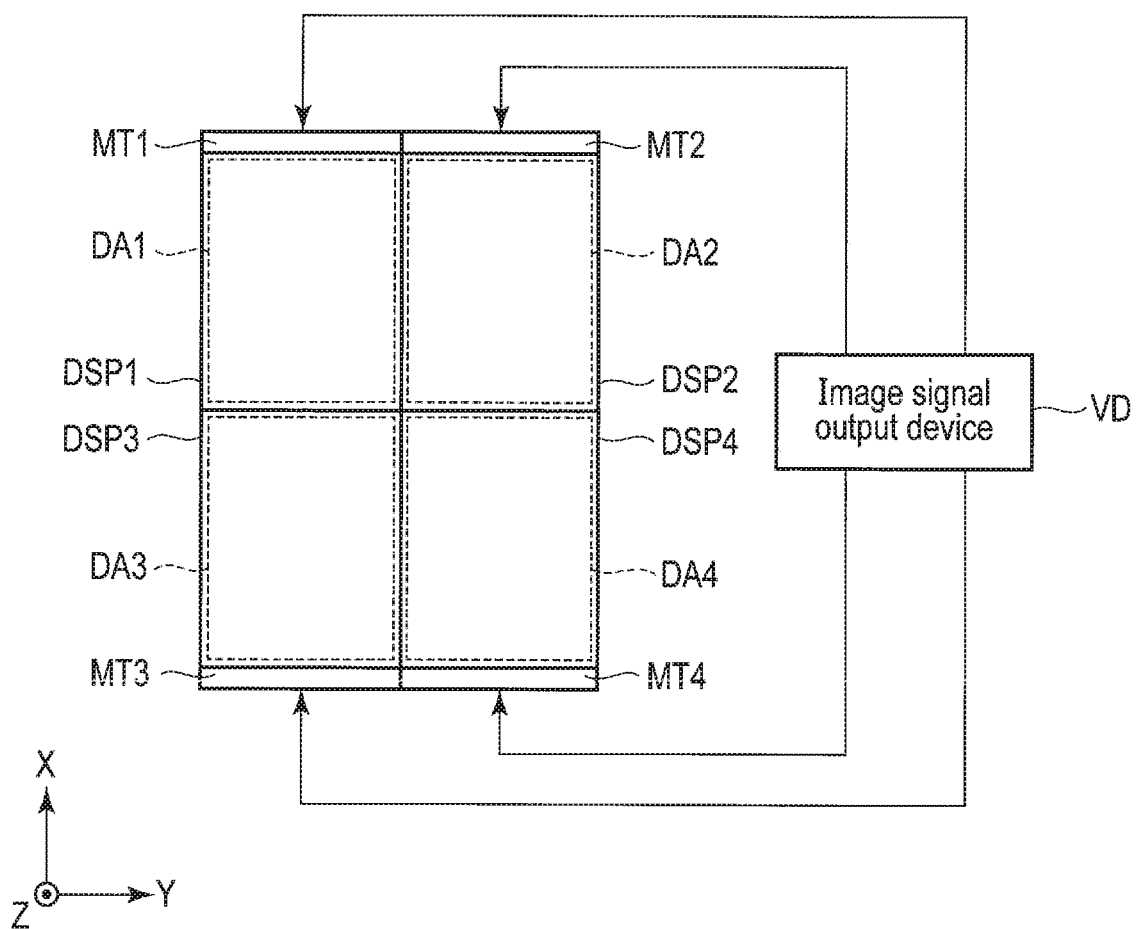
F I G. 22

DISPLAY DEVICE

CROSS-REFERENCE TO RELATED APPLICATIONS

This application is a Continuation Application of application Ser. No. 16/701,968, filed Dec. 3, 2019, which, in turn, is a Continuation Application of application Ser. No. 15/656,578, (now U.S. Pat. No. 10,539,843) filed Jul. 21, 2019 which claims the benefit of priority from Japanese Patent Application No. 2016-149916, filed Jul. 29, 2016, the entire contents of which are incorporated herein by reference.

FIELD

Embodiments described herein relate generally to a display device.

BACKGROUND

As display devices used for digital signage or the like, a multidisplay system in which a plurality of display devices are arranged as tiles for enlargement of display area has been known. Here, display devices include a bezel light shielding film in a frame-like non-display area (bezel) to shield drivers, dummy electrodes, and the like from the light. In the above multi-display system, the display image is cut by the bezels between adjacent display devices, and thus, thin-bezel structure of each display device is required for higher display quality.

BRIEF DESCRIPTION OF THE DRAWINGS

FIG. 20 is a plan view showing the structure of main pixels PX1 to PX3 of a variation 2 of an embodiment 2.

FIG. 22 shows an example of the structure of a multidisplay system.

DETAILED DESCRIPTION

Figure 1:
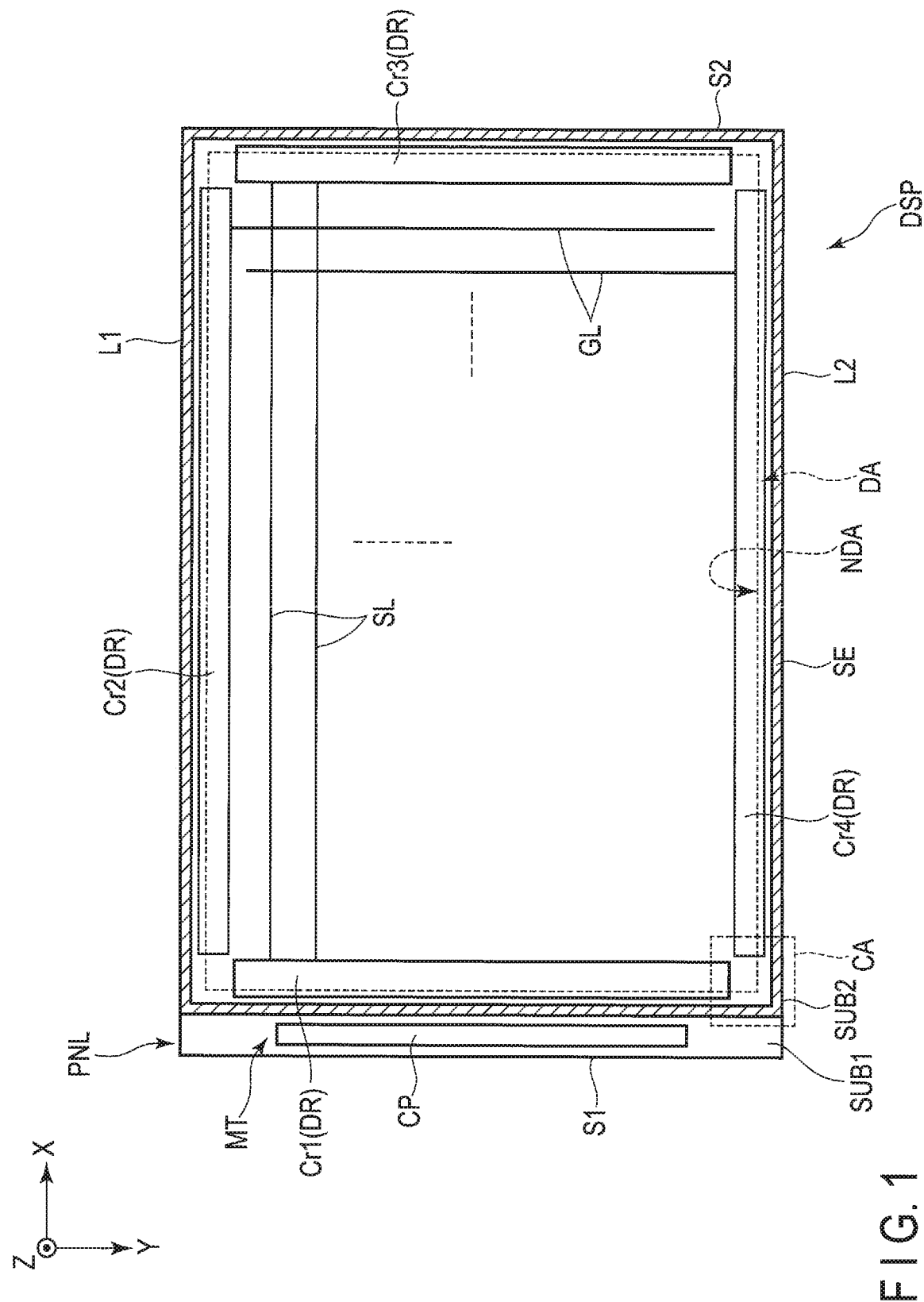
FIG. 1 is a plan view showing an example of the structure of a display device DSP.

In general, according to an embodiment, a display device comprising: a driver; a pixel circuit disposed to be apart from the driver in a plan view and to be electrically connected to the driver; a first pixel electrode disposed to overlap the pixel circuit in a plan view and to be electrically connected to the pixel circuit; a second pixel electrode disposed to overlap the driver in a plan view and to be closer to an outer edge of a display area than the first pixel electrode; and a relay line disposed between the pixel circuit and the first pixel electrode and between the driver and the second pixel electrode, the relay line electrically connecting the first pixel electrode and the second pixel electrode.

According to an embodiment, a display device comprising: a driver; a circuit group including first to third pixel circuits each electrically connected to the driver, the circuit group disposed to be apart from the driver in a plan view; a first electrode group including a first pixel electrode electrically connected to the first pixel circuit, a second pixel electrode electrically connected to the second pixel circuit and having an area which is greater than the area of the first pixel electrode, and a third pixel electrode electrically connected to the third pixel circuit and having an area which is greater than the area of the second pixel electrode, the first electrode group overlapping the circuit group in a plan view; a second electrode group including a fourth pixel electrode, a fifth pixel electrode having an area which is greater than the area of the fourth pixel electrode, and a sixth pixel electrode having an area which is greater than the area of the fifth pixel electrode, the second electrode group overlapping the driver in a plan view and being closer to an outer edge of a display area than the first pixel electrode; and a line group including first to third relay lines between the circuit group and the first electrode group and between the driver and the second electrode group, wherein the first relay line electrically connect the first pixel electrode and the fourth pixel electrode, the second relay line electrically connect the second pixel electrode and the fifth pixel electrode, and the third relay line electrically connect the third pixel electrode and the sixth pixel electrode.

Embodiments will be described hereinafter with reference to the accompanying drawings. Incidentally, the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. The schematic illustration is merely an example, and adds no restrictions to the interpretation of the invention. Besides, in the specification and drawings, the structural elements having functions, which are identical or similar to the functions of the structural elements described in connection with preceding drawings, are denoted by like reference numerals, and an overlapping detailed description is omitted unless necessary.

Embodiment 1

FIG. 1 is a plan view showing an example of the structure of a display device DSP.

In the figure, a first direction X and a second direction Y cross each other, and in some cases, they are orthogonal to each other. A third direction Z crosses the first direction X and the second direction Y, and in some cases, it is orthogonal to the first direction X and the second direction Y. Furthermore, seeing the display device DSP or a display panel PNL from a direction normal to the X-Y plane which is defined by the first direction X and the second direction Y will be referred to as a plan view.

The display device DSP includes, for example, a display panel PNL and a driver DR. The display panel PNL is formed as a rectangle having a pair of long sides L1 and L2 in the first direction X and a pair of short sides S1 and S2 in the second direction Y. Note that the shape of the display panel PNL is not limited to the example depicted, and it may have a polygonal shape other than quadrangle, or may have a curved shape such as a circle or an ellipse.

The display panel PNL includes a first substrate SUB1 and a second substrate SUB2. The first substrate SUB1 and the second substrate SUB2 are adhered by a sealant SE. The sealant SE is arranged along the short sides S1 and S2 and long sides L1 and L2 in, for example, a loop-like shape. The display panel PNL includes a display area DA used for image display within the sealant SE. The display panel PNL includes a frame-like non-display area NDA outside the display area DA. The display area DA includes, as will be described later, a plurality of pixel electrodes and pixel circuits. The first substrate SUB1 includes, in the display area DA, signal lines SL, scan lines GL, lines and power lines (which are not shown) used to supply various voltages, and the like. The signal lines SL are arranged in the first direction X. The scan lines GL are arranged in the second direction Y.

The driver DR supplies various voltages such as image signals to the pixel circuits to drive the pixel electrodes. The driver DR includes periphery circuits Cr1 to Cr4 positioned in the area surrounded by the sealant SE. The periphery circuits Cr1 to Cr4 are disposed in the first substrate SUB1 from the non-display area NDA to the periphery within the display area DA. For example, the periphery circuit Cr1 is disposed along the short side S1 and includes a signal line drive circuit and the like. The periphery circuit Cr2 is disposed along the long side L1 and includes a scan line drive circuit, polarity reverse circuit, common drive circuit, and the like. The periphery circuit Cr3 is disposed along the short side S2 and includes a protection circuit and the like. The periphery circuit Cr4 is disposed along the long side L2 and includes a scan line drive circuit, polarity reverse circuit, common drive circuit, and the like. The signal lines SL are electrically connected to the periphery circuits Cr1 and Cr3. The scan lines GL are electrically connected to the periphery circuit Cr2 or Cr4. Note that the driver DR may further include a drive time generation circuit, a power circuit, and the like.

In the example depicted, the display panel PNL includes a driver IC chip CP in the non-display area NDA. The driver IC chip CP is mounted on a mount MT of the first substrate SUB1 along the short side S1. The driver IC chip CP includes a part of the various circuits of the driver DR.

Figure 2:
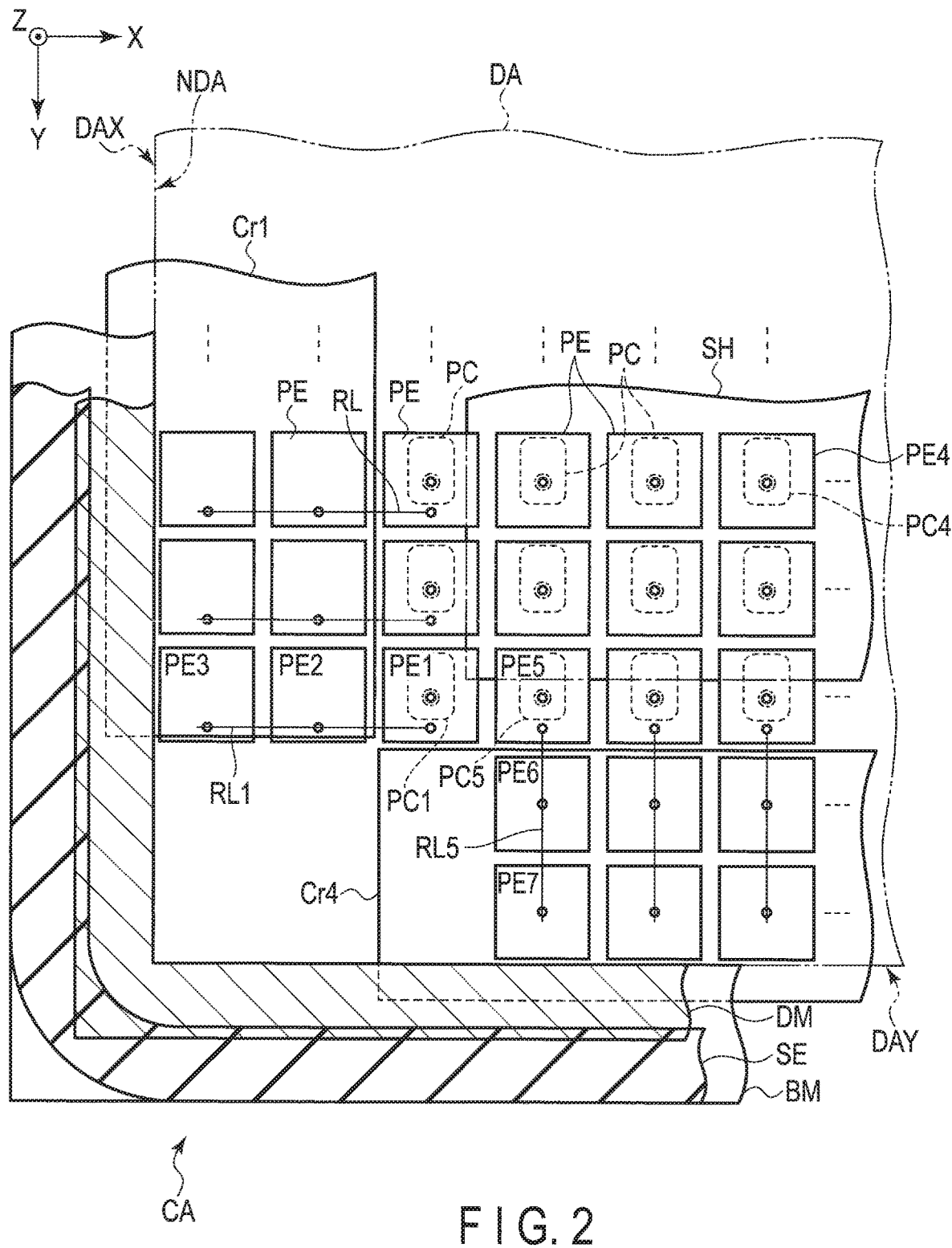
FIG. 2 is a plan view showing an area CA of the display device DSP of FIG. 1 in an enlarged manner.

FIG. 2 is a plan view showing an area CA of the display device DSP of FIG. 1 in an enlarged manner. In the example depicted, the display device DSP includes a plurality of static random access memories (SRAM) as memories to store data related to display in each pixel in the display area DA. That is, the display device DSP is a memory-in-pixel drive display device. In the figure, a pixel circuit PC corresponds to an SRAM and a pixel electrode PE corresponds to a display area of each pixel. Note that the memory is not limited to SRAM, and may be other memory structure such as dynamic random access memory (DRAM).

A plurality of pixel circuits PC, pixel electrodes PE, and relay lines RL are disposed in the display area DA. Furthermore, the periphery circuits Cr1 and Cr4 are partly disposed in the display area DA. In the example depicted, a light shield SH is disposed in the display area DA. In the example depicted, a sealant SE, dummy electrode DM, light shielding layer BM are disposed in the non-display area NDA, and the periphery circuits Cr1 and Cr4 are partly disposed therein. Note that, among outer edges of the display area DA facing the non-display area NDA, the ones extending in the first direction X and opposed to the non-display area NDA in the second direction Y are referred to as outer edges DAY, and the ones extending in the second direction Y and opposed to the non-display area NDA in the first direction X are referred to as outer edges DAX.

Now, the structure of the display area DA will be explained.

Pixel circuits PC are, in a plan view, apart from the periphery circuits Cr1 and Cr4 (driver DR) and disposed inside the driver DR. Furthermore, while some pixel circuits PC overlap the light shield SH, others may not overlap the light shield SH. The pixel circuits PC are each electrically connected to the driver DR through signal lines SL and scan lines GL shown in FIG. 1. Some pixel electrodes PE overlap the driver DR while others overlap the pixel circuits PC. Furthermore, some pixel electrodes PE overlap the light shield SH. The relay lines RL electrically connect the pixel electrodes PE in the proximity of the outer edges DAX and DAY with each other. The relay lines RL are disposed, in the third direction Z, between the pixel circuits PC and the pixel electrodes PE and between the driver DR and the pixel electrodes PE. The light shield SH is disposed inside the driver DR. The light shield SH shields light passing through a gap between the pixel electrodes PE and incident on the pixel circuits PC from the side where the arrow of the third direction Z is positioned. Note that, in the example depicted, the pixel circuits PC and the pixel electrodes PE are arranged in the first direction X and the second direction Y, respectively; however, the arrangement thereof is not limited thereto, and they may be arranged in other directions or may be arranged in a check.

Referring to the pixel circuits PC1, PC4, and PC5, pixel electrodes PE1 to PE7, and relay lines RL1 and RL5, the positional relationship and connection relationship of the pixel circuits PC and the pixel electrodes PE in a plan view will be explained.

The pixel circuit PC1 is disposed in the display area DA and is electrically connected to the driver DR. The pixel circuit PC1 is apart from the periphery circuit Cr1 and is adjacent to the periphery circuit Cr1 in the first direction X. The pixel electrode PE1 overlaps the pixel circuit PC1 and is apart from the periphery circuit Cr1. An end of the light shield SH overlaps the pixel electrode PE1. A part of the pixel electrode PE1 may overlap the periphery circuit Cr1 in a plan view. The pixel electrode PE1 is electrically connected to the pixel circuit PC1. The pixel electrodes PE2 and PE3 overlap the periphery circuit Cr1 and are apart from the pixel circuit PC1 and the pixel electrode PE1. The pixel electrodes PE1 to PE3 are arranged linearly in the first direction X. The pixel electrode PE2 is adjacent to the pixel electrode PE1 and is closer to the outer edge DAX than the pixel electrode PE1. The pixel electrode PE3 is adjacent to the pixel electrode PE2 and is closer to the outer edge DAX than is the pixel electrode PE2.

The relay line RL1 extends in the first direction X and overlaps the pixel electrodes PE1 to PE3. The relay line RL1 electrically connects the pixel electrodes PE1, PE2, and PE3 with each other. That is, the pixel electrodes PE1 to PE3 are each driven by pixel circuit PC1 in synchronization. Note that, as will be described later, the relay line RL1 is, in the third direction Z, disposed between the pixel circuit PC1 and the pixel electrode PE1, between the periphery circuit Cr1 and the pixel electrode PE2, and between the periphery circuit Cr1 and the pixel electrode PE3. The relay line RL1 is, in the example depicted, apart from the pixel circuit PC1; however, is may overlap the pixel circuit PC1.

The pixel circuit PC4 is more apart from the driver DR (periphery circuits Cr1 and Cr4) than is the pixel circuit PC1. The pixel electrode PE4 overlaps the pixel circuit PC4 and is electrically connected to the pixel circuit PC4. The light shield SH overlaps the pixel electrode PE4 and the pixel circuit PC4.

The pixel circuit PC5 electrically connected to the driver DR is apart from the periphery circuit Cr4 and is adjacent to the periphery circuit Cr4 in the second direction Y. The pixel electrode PE5 is adjacent to the pixel electrode PE1 in the first direction X and is more apart from the outer edge DAX than is the pixel electrode PE1. The light shield SH overlaps a gap between the pixel electrodes PE1 and PE5. Furthermore, an end of the light shield SH overlaps the pixel electrode PE5. The pixel electrode PF overlaps the pixel circuit PC5 and is electrically connected to the pixel circuit PC5.

The pixel electrode PE6 overlaps the periphery circuit Cr4 and is adjacent to the pixel electrode PE5 in the second direction Y. The pixel electrode PE7 overlaps the periphery circuit Cr4 and is adjacent to the pixel electrode PE6 in the second direction Y. The pixel electrode PE6 is closer to the outer edge DAY than is the pixel electrode PE5, and the pixel electrode PE7 is closer to the outer edge DAY than the pixel electrode PE6.

The relay line RL5 extends in the second direction Y and overlaps the pixel electrodes PE5 to PE7. The relay line RL5 electrically connects the pixel electrodes PE5, PE6, and PE7 with each other. That is, the pixel electrodes PE5 to PE7 are each driven by the pixel circuit PC5 in synchronization.

Now, the structure of the non-display area NDA in a plan view will be explained.

The sealant SE is disposed along the outer edges DAX and DAY in the display area DA and is disposed to be apart from the outer edges DAX and DAY. In the example depicted, the sealant SE is apart from the periphery circuits Cr1 and Cr4.

The dummy electrode DM is disposed along the outer edges DAX and DAY and is disposed between the outer edge DAX and the light shielding layer BM and between the outer edge DAY and the light shielding layer BM. In the example depicted, the dummy electrode DM is adjacent to the outer edges DAX and DAY and partly overlaps the sealant SE. Note that, the dummy electrode DM may be apart from the outer edges DAX and DAY and the sealant SE. The dummy electrode DM is disposed in the first substrate SUB1 of FIG. 1 and is electrically connected to a power line of constant potential which is not shown. The power line here is, for example, a common potential power line connected to a common drive circuit. The dummy electrode DM is disposed to take in ionic impurities, for example. The display device DSP may not include a dummy electrode DM.

The light shielding layer BM is disposed in the second substrate SUB2 of FIG. 1. The light shielding layer BM is adjacent to the outer edges DAX and DAY to surround the display area DA. The light shielding layer BM overlaps the sealant SE and the dummy electrode DM. In the example depicted, the light shielding layer BM does not overlap the entirety of the periphery circuits Cr1 and Cr4 but overlaps only a part of the periphery circuits Cr1 and Cr4. The light shielding layer BM may be apart from the periphery circuits Cr1 and Cr4. The display device DSP may not include the light shielding layer BM.

Figure 3:
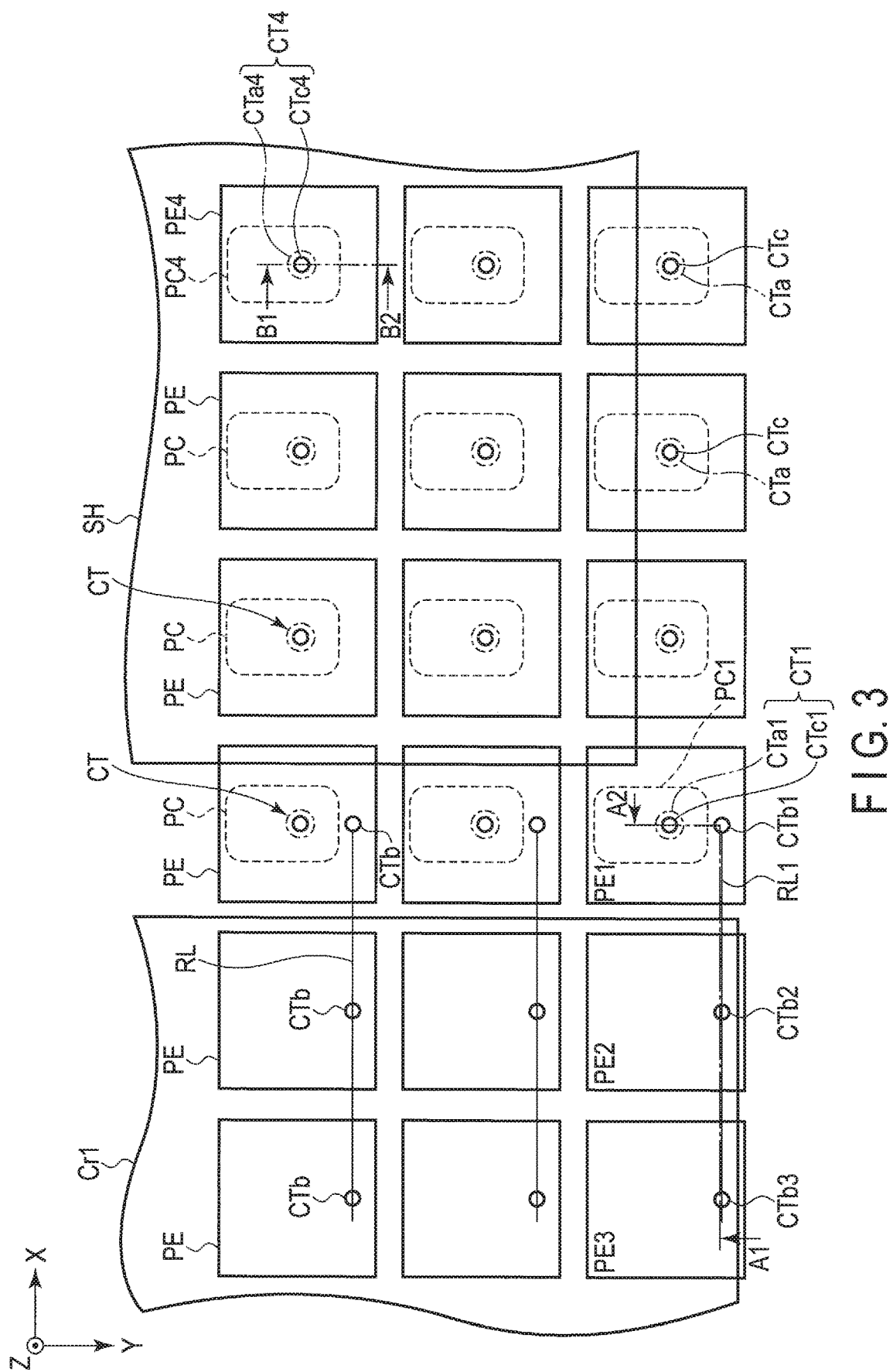
FIG. 3 is a plan view showing an area including pixel electrodes PE1 and PE3 of FIG. 2 in an enlarged manner.

FIG. 3 is a plan view showing an area including the pixel electrodes PE1 and PE3 of FIG. 2 in an enlarged manner.

In a plan view, a lower connector CTa1 and an upper connector CTc1 are disposed in the area overlapping the pixel circuit PC1 and the pixel electrode PE1. In the example depicted, at least a part of the upper connector CTc1 overlaps the lower connector CTa1. The lower connector CTa1 and the upper connector CTc1 correspond to a connector CT1 used to electrically connect the pixel circuit PC1 and the pixel electrode PE1. The lower connector CTa1 and the upper connector CTc1 may be apart from each other. In that case, the lower connector Dia1 and the upper connector CTc1 are electrically connected by a line. The line and the relay line RL1 are disposed over the same layer.

An upper connector CTb1 is disposed in the area overlapping the relay line RL1 and the pixel electrode PE1. The relay line PL1 and the pixel electrode PE1 are electrically connected through the upper connector CTb1. The upper connector CTb1 is, in the example depicted, apart from the connector CT1 in the second direction Y. Note that the upper connector CTb1 may be formed integrally with the upper connector CTc1. In the structure where the upper connector CTb1 and the upper connector CTc1 are apart from each other, the layout of the relay line RL1 is designed more freely. Furthermore, the upper connector CTb1 is, in the example depicted, apart from the pixel circuit PC1. In such a structure, the relay line RL1 can be disposed to be apart from a part of the conductive material of the pixel circuit PC1 in a plan view, and thus, an unnecessary capacitance formed by the relay line RL1 can be suppressed. Note that the conductive material of the pixel circuit PC1 includes, for example, switches SW1, SW2, and SW3, inverters IV1 and IV2, signal lines SL, scan lines GL, and power lines VL as will be described later.

Upper connector CTb2 and CTb3 are arranged in the first direction X with the upper connector CTb1. The upper connector CTb2 is disposed in the area overlapping the relay line RL1 and the pixel electrode PE2, and the upper connector CTb3 is disposed in the area overlapping the relay line RL1 and the pixel electrode PE3. The relay line RL1 and the pixel electrode PE2 are electrically connected through the upper connector CTb2. The relay line RL1 and the pixel electrode PE3 are electrically connected through the upper connector CTb3.

Note that, in the area overlapping the pixel circuit PC4 and the pixel electrode PE4, a lower connector CTa4 and an upper connector CTc4 are disposed overlapping each other.

The pixel circuit PC and the pixel electrode PE4 are electrically connected through a connector CT4 including the lower connector CTa4 and the upper connector CTc4.

From a general standpoint, connectors CT (lower connectors CTa and upper connectors CTc) are disposed. inside the periphery circuit Cr1. The connectors CT are each disposed in the area corresponding to the pixel electrode PE. Furthermore, in each area corresponding to the pixel electrode PE overlapping the periphery circuit Cr1 and corresponding to the pixel electrode PE adjacent to the periphery circuit Cr1, upper connectors CTb are each disposed.

In the example depicted, the connectors CT are arranged with an even pitch in the first direction X and in the second direction Y. The position of the connectors CT is determined on the basis of the layout of the pixel circuit PC, and in the example depicted, the connectors CT are disposed in the center of the area corresponding to the pixel electrodes PE. The upper connectors CTb are arranged along the relay lines RL and, in the example depicted, arranged in the first direction X with an even pitch. The position of the upper connectors CTb is not limited specifically, and in the example depicted, the upper connectors CTb are disposed in the center in the first direction X and an ends in the second direction Y of the area corresponding to the pixel electrodes PE.

Figure 4:
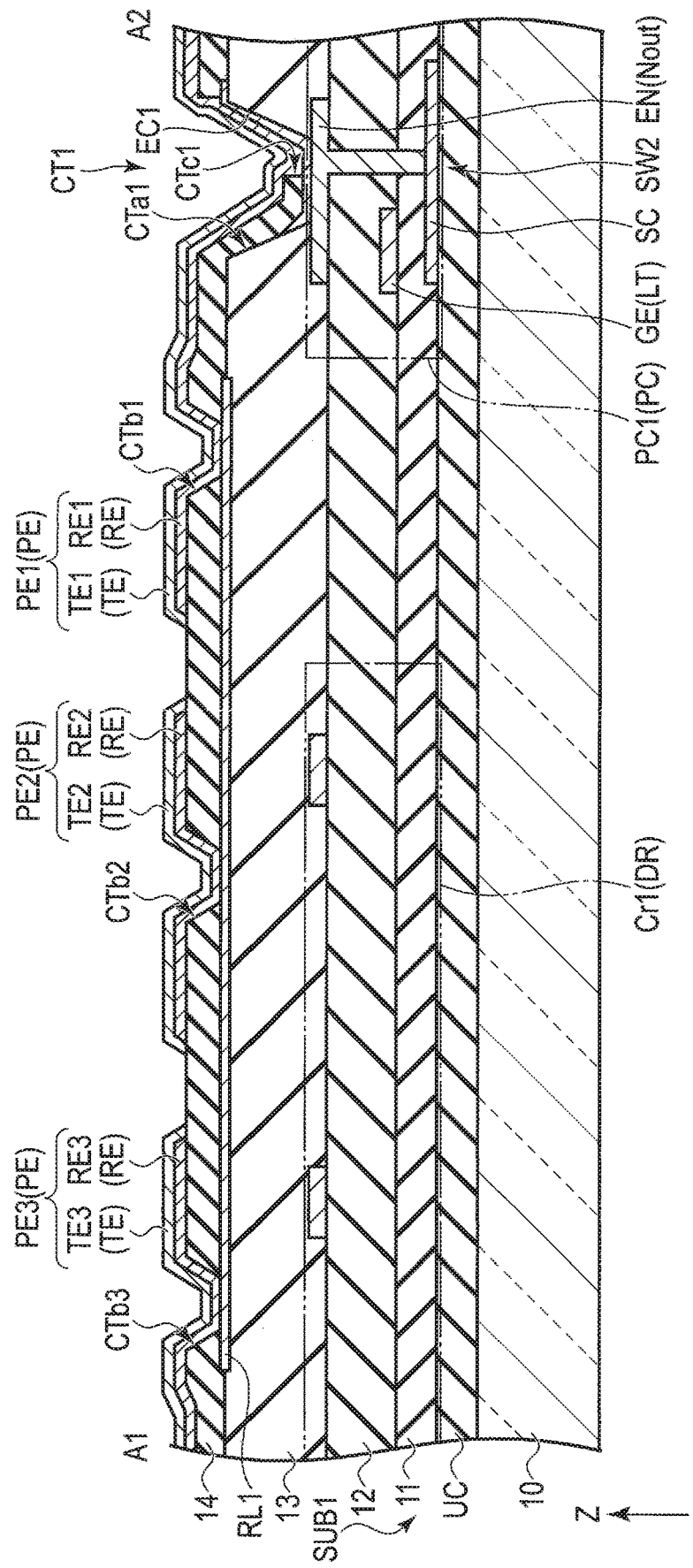
FIG. 4 is a cross-sectional view of the first substrate SUB1, taken along line A1-A2 of FIG. 3.
Figure 5:
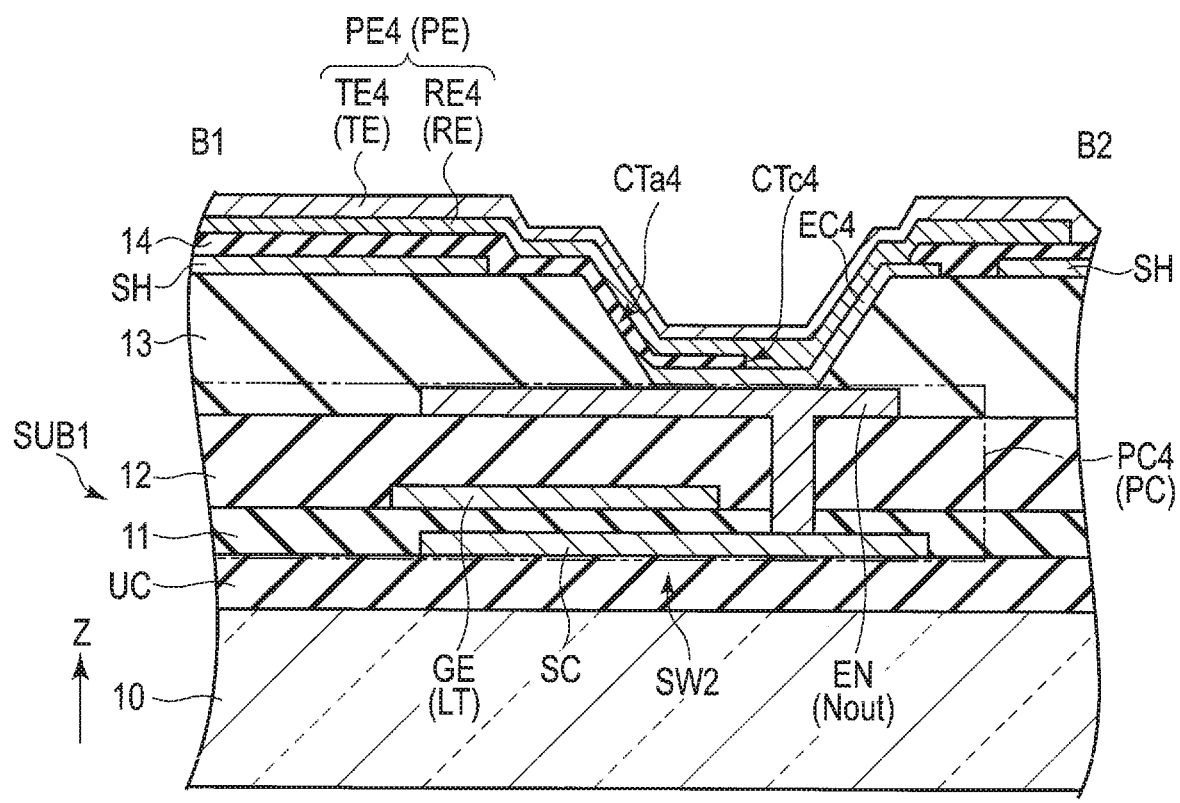
FIG. 5 is a cross-sectional view of the first substrate SUB1, taken along line B1-B2 of FIG. 3.

Now, the positional relationship between the periphery circuit Cr1, pixel circuit PC, relay line RL, pixel electrode PE, and the like in the third direction Z will be explained with reference to FIGS. 4 and 5. Note that only the structures necessary for the explanation are depicted in FIGS. 4 and 5. Furthermore, the side pointed by the arrow of the third direction Z is up (above), and the opposite side is down (below).

FIG. 4 is a cross-sectional view of the first substrate SUB1, taken along line A1-A2 of FIG. 3.

In the area shown, the first substrate SUB1 includes, for example, an insulating substrate 10, undercoat layer UC, insulating films 11, 12, 13, and 14, periphery circuit Cr1, pixel circuit PC1, contact electrode EC1, relay line RL1 and pixel electrodes PE1 to PE3.

The insulating substrate 10 is, for example, an insulating substrate including a pair of flat main surfaces opposed to each other in the third direction Z. The undercoat layer UC is disposed on the insulating substrate 10. The undercoat layer UC may have a multilayer structure including a plurality of insulating films. Furthermore, the undercoat layer UC may be omitted. The insulating film 11 is disposed above the undercoat layer UC, the insulating film 12 is disposed above the insulating film 11, the insulating film 13 is disposed above the insulating film 12, and the insulating film 14 is disposed above the insulating film 13. The insulating films 11, 12, and 14 are formed of an inorganic material such as a silicon nitride or a silicon oxide. The insulating film 13 is formed of an organic material such as a resin. However, the materials for the insulating films 11 to 14 are not limited specifically, and the insulating film 13 may be formed of an inorganic material and the insulating film 14 may be formed of an organic material.

The periphery circuit Cr1 is disposed in the area between the upper surface of the undercoat layer UC (if the undercoat layer UC is omitted, on the upper surface of the insulating substrate 10) and the lower surface of the insulating film 13. Note that, although this is not shown, the periphery circuit Cr1 includes various lines such as scan lines and signal lines as above and various circuit devices such as n-channel MOS thin film transistors (TFT) and p-channel MOS thin film transistors, for example. A semiconductor layer of the thin film transistor of the periphery circuit Cr1 can be formed of a silicon semiconductor such as polycrystalline silicon or amorphous silicon, or an oxide semiconductor such as indium, gallium, or zinc, and such semiconductor materials can be selected arbitrarily. Note that if a semiconductor layer is formed of polycrystalline silicon, the thin film transistor can be a CMOS-TFT, and thus, the driver DR can be miniaturized.

The pixel circuit PC1 is, as above, disposed in the area between the upper surface of the undercoat layer UC (if the undercoat layer UC is omitted, on the upper surface of the insulating substrate 10) and the lower surface of the insulating film 13. That is, the pixel circuit PC1 and the periphery circuit Cr1 are disposed on the same layer. The pixel circuit PC1 includes a switch SW2.

The switch SW2 is formed of, for example, a TFT and includes a semiconductor layer SC, gate electrode GE, and node electrode EN which corresponds to a source drain. The semiconductor layer SC is disposed above the insulating substrate 10 and is covered with the insulating film 11. The gate electrode GE is disposed above the insulating film 11 and is covered with the insulating film 12. The gate electrode GE is electrically connected to a latch LT which will be described later with reference to FIG. 12 in the area which is not shown. Note that, in the example depicted, the switch SW2 is a top gate type TFT in which the gate electrode GE is dispose above the semiconductor layer SC; however, it may be a bottom gate type TFT in which the gate electrode GE is disposed below the semiconductor layer SC. Furthermore, the switch SW2 in the figure is a single gate type TFT in which one gate electrode GE is opposed to the semiconductor layer SC; however, it may be a double gate type TFT in which two gate electrodes GE are opposed to the semiconductor layer SC.

The node electrode EN is disposed on the insulating film 12, contacts the semiconductor layer SC, and is covered with a third insulating film 13. The node electrode EN corresponds to an output node rout which will be described later with reference to FIG. 12 and is electrically connected to a semiconductor layer of a switch SW3 which will be described layer with reference to FIG. 12 in an area which is not shown.

In the insulating film 13, the lower connector CTa1 is formed. The lower connector CTa1 penetrates the insulating film 13 and exposes the node electrode EN from the insulating film 13. The contact electrode EC1 is formed inside the lower connector CTa1 and covers the node electrode EN inside the lower connector CTa1. In the insulating film 14, the upper connectors CTc1, CTb1 to CTb3 are formed. The upper connector CTc1 penetrates the insulating film 14 and exposes the contact electrode EC1 from the insulating film 14. The contact electrode EC1 is covered with the pixel electrode PE1. That is, the connector CT1 is disposed between the pixel circuit PC1 and the pixel electrode PE1. Note that, in the example depicted, the lower connector CTa1 and the upper connector CTc1 are formed such that their ends are shifted; however, they may be formed such that the ends are continued. The upper connectors CTb1 to CTb3 penetrates the insulating film 14 and expose the relay line RL1.

The relay line PL1 is disposed between the insulating film 13 and the insulating film 14. That is, the relay line RL1 is apart from the pixel circuit PC1 and the periphery circuit Cr1 by at least the thickness in the third direction Z of the insulating film 13. Thus, if the insulating film 13 is a film of an organic material which is thicker than an inorganic insulating film, an unnecessary capacitance formed by the relay line RL1 with the pixel circuit PC1 and be periphery circuit Cr1 can be suppressed. The relay line PL1 is formed of a metal material such as molybdenum, tungsten, aluminum, or titanium or an alloy material including the above metal materials. The materials for the relay line RL1 are conductive materials which are not limited specifically, and they may be a transparent conductive material such as an indium tin oxide (ITO) or an indium zinc oxide (IZO). Furthermore, the relay line RL1 may have a multilayered structure in the third direction Z.

The pixel electrode PE1 is disposed on the insulating film 14 and inside the upper connector CTc1, The pixel electrode PE1 contacts the contact electrode EC1 inside the upper connector CTc1 and is electrically connected to the pixel circuit PC1 (node electrode EN) through the contact electrode EC1. The pixel electrode PE1 disposed inside the upper connector CTb1 and contacts the relay line RL1 inside the upper connector CTb1.

The pixel electrode PE2 is adjacent to the pixel electrode PE1 with a gap therebetween, and the pixel electrode PE3 is adjacent to the pixel electrode PE2 with a gap therebetween. The pixel electrodes PE2 and PE3 are apart from the periphery circuit Cr1 in the third direction Z. The pixel electrode PE2 is disposed on the insulating film 14 and inside the upper connector CTb2. The pixel electrode PE2 contacts the relay line RL1 inside the upper connector CTb2. The pixel electrode PE3 is disposed on the insulating film 14 and inside the upper connector CTb3. The pixel electrode PE3 contacts the relay line RL1 inside the upper connector CTb3.

In the example depicted, the pixel electrode PE1 includes a reflection electrode RE1 and a transparent electrode TE1. The pixel electrodes PE2 and PE3 include reflection electrodes RE2 and RE3 and transparent electrodes TE2 and TE3, respectively. The pixel electrode of FIG. 5 has the similar structure, and in the structure of the present embodiment, all pixel electrodes PE include a reflection electrode RE and a transparent electrode TE. The reflection electrode RE is disposed below the pixel electrode PE, and the transparent electrode TE covers the reflection electrode RE. The reflection electrode RE is formed of a light reflective metal material such as aluminum or silver. The transparent electrode TE is formed of a light transmissive transparent conductive material such as ITO or IZO which suppresses damage or corrosion to the reflection electrode RE and suppresses decrease of light reflection ratio of the pixel electrode PE.

FIG. 5 is a cross-sectional view of the first substrate SUB1, taken along line B1-B2 of FIG. 3.

In the cross-section of the area in the figure, a relay line RL is not disposed. In this respect, the cross-section of FIG. 5 differs from that of FIG. 4.

In the cross-section of the area in the figure, the first substrate SUB1 includes, for example, a pixel circuit PC4, contact electrode EC4, light shield SH, and pixel electrode PE4.

The pixel circuit PC4 is, as with the pixel circuit PC1, disposed on the same layer with the driver DR. The contact electrode EC4 is disposed inside the lower connector CTa4 penetrating the insulating film 13, and covers the node electrode EN inside the lower connector CTa4. The pixel electrode PE4 is disposed inside the upper connector CTc4 penetrating the insulating film 14 and contacts the contact electrode EC4. The pixel electrode PE4 is electrically connected to the pixel circuit PC4 (node electrode EN) through the contact electrode EC4.

The light shield SH is disposed between the insulating film 13 and the insulating film 14 and is disposed on the same layer (insulating film 13) with the relay lines RL. The light shield SH is formed of, for example, a light shielding metal material and is, preferably, formed of the same material used for the relay line RL. In that case, the relay lines RL and the light shield SH can be formed through the same process. As shown in FIG. 2, the light shield SH is apart from the relay lines RL. Furthermore, as shown in FIG. 5, the light shield SH is apart from the lower connector CTa4 and the upper connector CTc4. The light shield SH is disposed between the pixel circuit PC4 and the pixel electrode PE4. Furthermore, the light shield SH is disposed in the area opposed to gaps between adjacent pixel electrodes PE. Thus, the light shield SH can block light penetrating the gaps between adjacent pixel electrodes PE and incident on the pixel circuit PC from the above of the first substrate SUB1.

Figure 6:
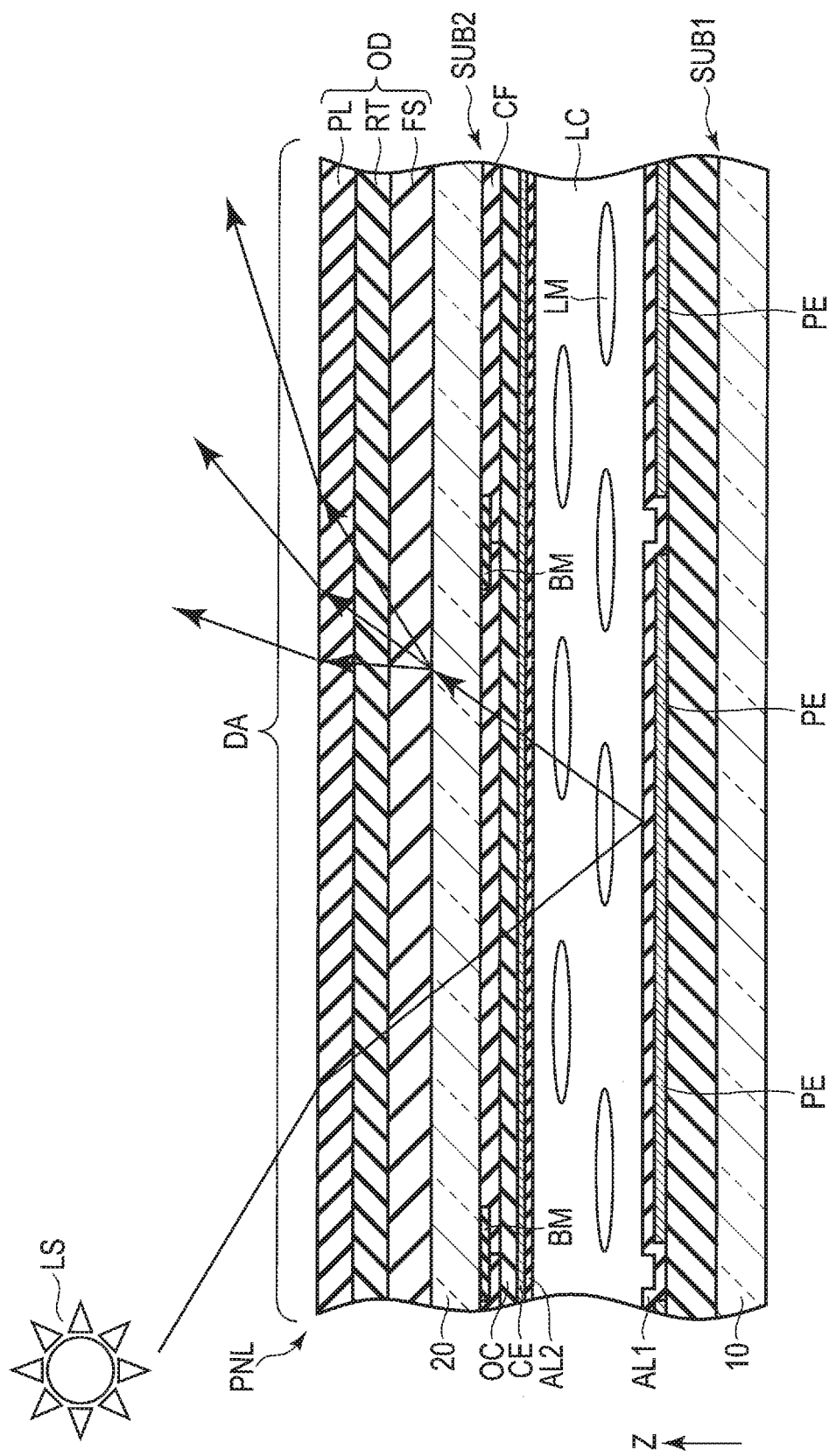
FIG. 6 is a cross-sectional view of the display panel PNL.

FIG. 6 shows a cross-sectional view of the display panel PNL.

Here, in the cross-section of the display panel PNL in the display area DA, only the elements necessary for the explanation are shown. The display panel PNL includes a first substrate SUB1, second substrate SUB2, liquid crystal layer LC, and optical device OD.

In addition to the structure explained with reference to FIGS. 4 and 5, the first substrate SUB1 includes an alignment film AL1. The alignment film AL1 covers the pixel electrodes PE.

The second substrate SUB2 includes, for example, an insulating substrate 20, light shielding layer BM, color filter layer CF, overcoat layer OC, common electrode CR, and alignment film AL2.

The light shielding layer BM is disposed on the insulating substrate 20 in the side opposed to the first substrate SUB1. The light shielding layer BM is, in the display area DA depicted, opposed to gaps between the pixel electrodes PE. Furthermore, the light shielding layer BM is, as shown in FIG. 2, disposed in the non-display area NDA.

The color filter layer CF is disposed on the insulating substrate 20 in the side opposed to the first substrate SUB1 and partly overlaps the light shielding layer BM. The color filter layer CF is opposed to the pixel electrodes PE1 to PE7 shown in FIG. 2, and in this example, is opposed to all pixel electrode PE. The color filter layer CF includes, for example, a red color filter, green color filter, and blue color filter. The red color filter is opposed to a pixel electrode of a red subpixel (red pixel). The green color filter is opposed to a pixel electrode of a green subpixel (green pixel). The blue color filter is opposed to a pixel electrode of a blue subpixel (blue pixel). When the color filter layer CF includes red, green, and blue color filters, the main pixel includes at least one red pixel, one green pixel, and one blue pixel. Note that the color filter layer CF may include a different color filter, and for example, the color filter layer CF may include a white color filter disposed in a white subpixel, or may include a transparent layer.

The overcoat layer OC covers the color filter layer CF. The common electrode CE is disposed on the overcoat layer OC in the side opposed to the first substrate SUB1. The common electrode CE is opposed to the pixel electrodes PB. The common electrode CE is formed of a transparent conductive material such as ITO or IZO. The alignment film AL2 covers the common electrode CE.

Note that, in the second substrate SUB2, if color filters of different colors are layered at boundaries of subpixels displaying different colors, the transmissivity can be decreased, and thus, the light shielding layer BM may be omitted. The color filter layer CF is omitted in a monochrome display type display panel PNL.

The liquid crystal layer LC is held between the first substrate SUB1 and the second substrate SUB2 and includes liquid crystal molecules LM disposed between the alignment film AL1 and the alignment film AL2. When no voltage is applied to the liquid crystal layer LS, the liquid crystal molecules LM are initially aligned by an alignment restriction force of the alignment films AL1 and AL2 adjacent to the liquid crystal layer LC. When a voltage is applied to the liquid crystal layer LC, the alignment of the liquid crystal molecules LM change in accordance with the size of an applied voltage.

The optical device OD is disposed on the second substrate SUB2 in the opposite surface of the surface contacting the liquid crystal layer LC. The optical device OD includes, for example, a diffusion layer FS, retardation plate RT, and polarizer PL. In the example depicted, the diffusion layer FS is adhered to the insulating substrate 20, the retardation plate RT is layered on the diffusion layer FS, and the polarizer PL is layered on the retardation plate RT. Note that the structure of the optical device OD is not limited to the example depicted.

The structure of the diffusion layer FS is not limited specifically as long as it diffuses incident light on the pixel electrode PE and reflection light reflected by the pixel electrode PE. Furthermore, the diffusion layer FS is, in the example depicted, disposed in the optical device OD on the second substrate SUB2; however, the position thereof is not limited specifically as long as it is disposed in the pixel electrode PE the opposite side of the side opposed to the relay lines RL while being opposed to the pixel electrode PE. The diffusion layer FS can suppress unevenness in the display quality caused by asperity of the pixel electrodes PE by diffusing the reflection light on the pixel electrodes PE, and thus, a view angle can be increased.

In the example depicted, the diffusion layer FS is an anisotropic diffusion layer which diffuses incident light from a particular direction. The diffusion layer FS as an anisotropy diffusion layer almost completely passes incident light from the light source LS side in the figure without diffusion but diffuses light from a particular direction, that is, reflection light from the pixel electrodes PE. Note that the diffusion layer FS as an anisotropy diffusion layer preferably, includes a plurality of layers in order to increase a diffusion range and to prevent light interference. The retardation plate RT functions as a quarter-wavelength plate. For example, the retardation plate RT is a combination of a quarter-wavelength plate and a half-wavelength plate which reduces wavelength dependency and is composed to obtain a desired retardation within the wavelength range used for color display. The polarizer PL includes a transmissive axis, and passes polarized light components which are parallel to the transmissive axis and absorbs or reflects polarized light components which are orthogonal to the transmissive axis.

In such a display panel PNL, the side in the proximity of the light source LS corresponds to the display surface. In the example depicted, the surface of the optical device OD corresponds to the display surface; however, if a cover member is disposed on the surface of the optical device OD, the surface of the cover member corresponds to the display surface. The light incident on the display panel PNL from the light source LS becomes linear polarized light when passing the polarizer PL. The direction of polarized light of the incident light changes on the basis of the size of a voltage applied to the pixel electrodes PE when passing the liquid crystal layer LC. If the direction of polarized light does not change, the incident light is reflected by the pixel electrodes PE and then is emitted from the display surface passing the polarizer PL. If the direction of polarized light changes 90 degrees, the incident light is reflected by the pixel electrodes PE and then is absorbed or reflected by the polarizer PL and does not exit the display surface.

Figure 7:
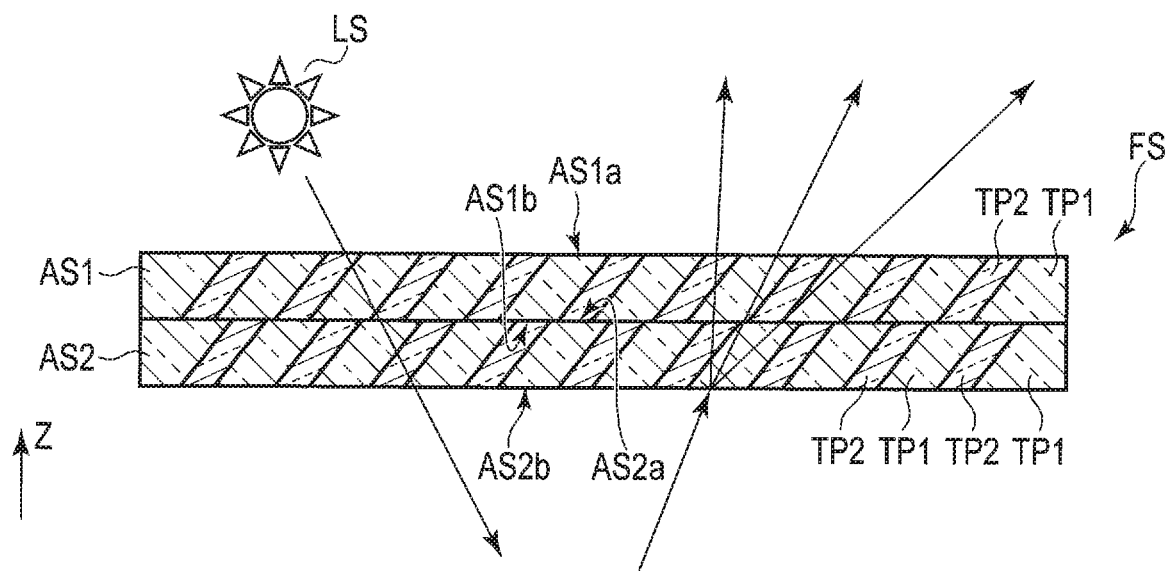
FIG. 7 is a cross-sectional view of the diffusion layer FS of FIG. 6.

FIG. 7 is a cross-sectional view of the diffusion layer FS of FIG. 6.

In the example depicted, the diffusion layer FS includes anisotropy diffusion layers AS1 and AS2 layered therein. The anisotropy diffusion layer AS1 includes an upper surface AS1a in the side closer to the light source LS and a lower surface AS1b in the opposite side of the upper surface AS1a. The anisotropy diffusion layer AS2 includes an upper surface AS2a in the side closer to the light source LS and a lower surface AS2b in the opposite side of the upper surface AS2a. The anisotropy diffusion layer AS2 is disposed on the anisotropy diffusion layer AS1 in the side opposed to the pixel electrodes PE, and the anisotropy diffusion layers AS1 and AS2 are adhered together, for example.

The anisotropy diffusion layer AS1 includes a plurality of transparent parts TP1 and a plurality of transparent parts TP2. The refractive index of the transparent part TP1 is different from the refractive index of the transparent part TP2. The transparent parts TP1 and TP2 are arranged from the upper surface AS1a to the lower surface AS1b and are inclined in the same direction with respect to the third direction Z. The transparent parts TP1 and TP2 are arranged alternately in the direction parallel to the upper surface AS1a (lower surface AS1b). Note that the anisotropy diffusion layer AS2 includes transparent parts TP1 and TP2 with the same structure as the anisotropy diffusion layer AS1. In the example depicted, the transparent parts TP2 of the anisotropy diffusion layer AS1 in the lower surface AS1b are shifted from the transparent parts TP2 of the anisotropy diffusion layer AS2 in the upper surface AS2a.

Figure 8:
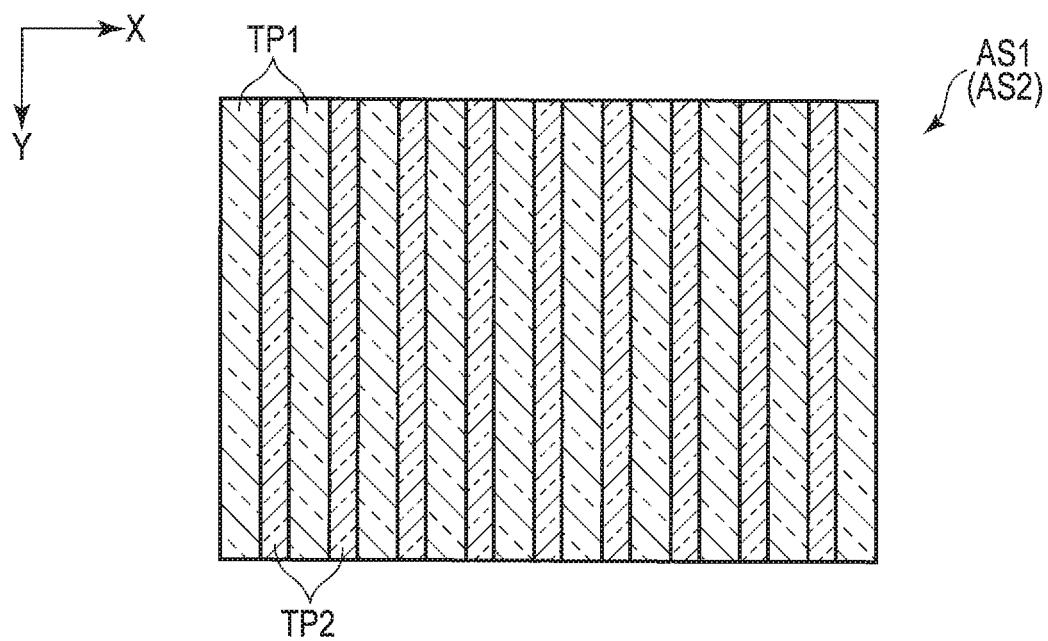
FIG. 8 is a plan view of an anisotropy diffusion layer AS1 of FIG. 7.

FIG. 8 is a plan view of the anisotropy diffusion layer AS1 of FIG. 7.

The transparent parts TP1 and TP2 extend in the second direction Y as stripes and are arranged alternately in the first direction X. The width of the transparent parts TP1 and TP2 is not limited. For example, the width of the transparent part TP1 in the first direction X is greater than the width of the transparent part TP2 in the first direction X.

Note that, in FIG. 8, an example in which the transparent parts TP1 and TP2 extend in the second direction Y; however, no limitation is intended thereby. The transparent parts TP1 and TP2 may extend in the first direction X or in a direction crossing the first direction X and the second direction Y.

Furthermore, the anisotropy diffusion layers AS1 and AS2 of FIGS. 7 and 8 have a louver structure in which plate-like transparent parts TP2 are arranged in transparent parts TP1 at certain intervals; however, no limitation is intended thereby. The anisotropy diffusion layers AS1 and AS2 may have a pillar structure in which pillar-like transparent parts TP2 are arranged within the transparent parts TP1. The diffusion layer FS may be a layered structure of a combination of different structure anisotropy diffusion layers.

Figure 9:
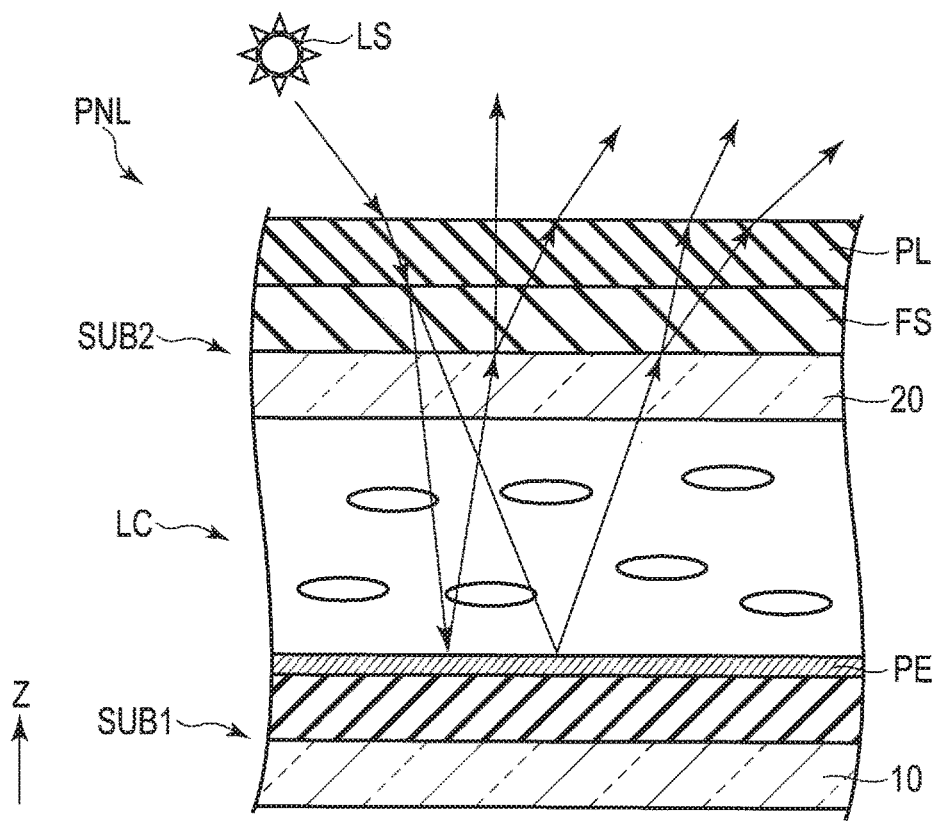
FIG. 9 is a cross-sectional view of the display panel PNL in which an example of light passage of incident light when diffusion by a diffusion layer FS is isotropic is illustrated.

FIG. 9 is a cross-sectional view of the display panel PNL in which a light passage of incident light when the diffusion of the diffusion layer FS is isotropic is illustrated.

In the example depicted, the diffusion layer FS is an isotropy diffusion layer which diffuses incident light from any direction. Such a diffusion layer FS diffuses incident light on the pixel electrodes PE from the light source LS side in the figure and diffuses reflection light by the pixel electrodes PE. The diffusion layer FS is, for example, a light diffusive adhesive agent.

Figure 10:
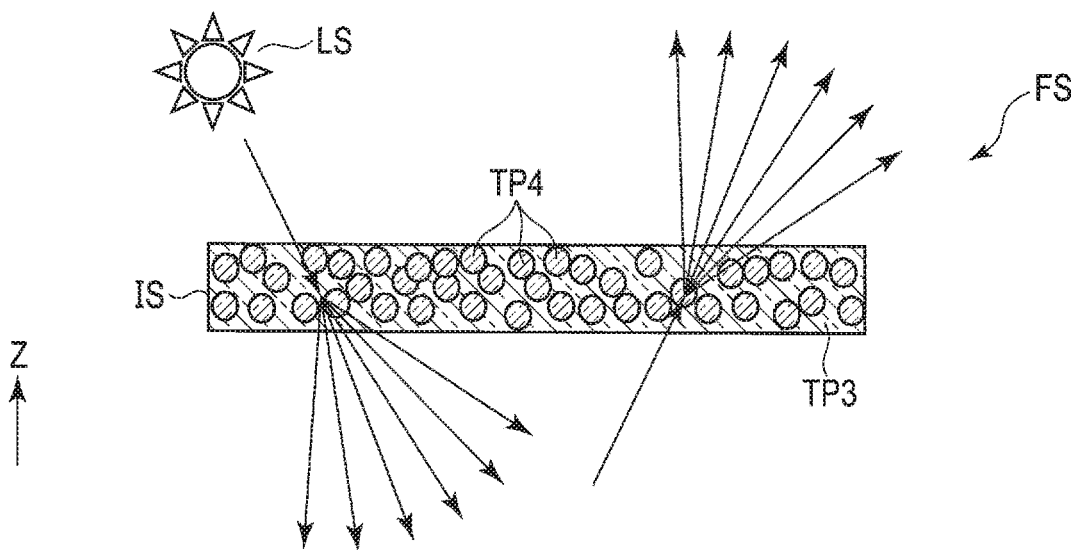
FIG. 10 is a cross-sectional view of the diffusion layer FS of FIG. 9.

FIG. 10 is a cross-sectional view of the diffusion layer FS of FIG. 9.

The diffusion layer FS includes an isotropy diffusion layer IS. The isotropy diffusion layer IS includes a transparent part TP3 and a plurality of transparent parts TP4. The refractive index of the transparent part TP4 is different from the refractive index of the transparent part TP3. The transparent part TP4 is formed as, for example, a sphere; however, the shape thereof is not limited specifically, and it may be a different shape such as a pillar or a disc. The transparent parts TP4 are dispersed in the transparent part TP3.

Figure 11:
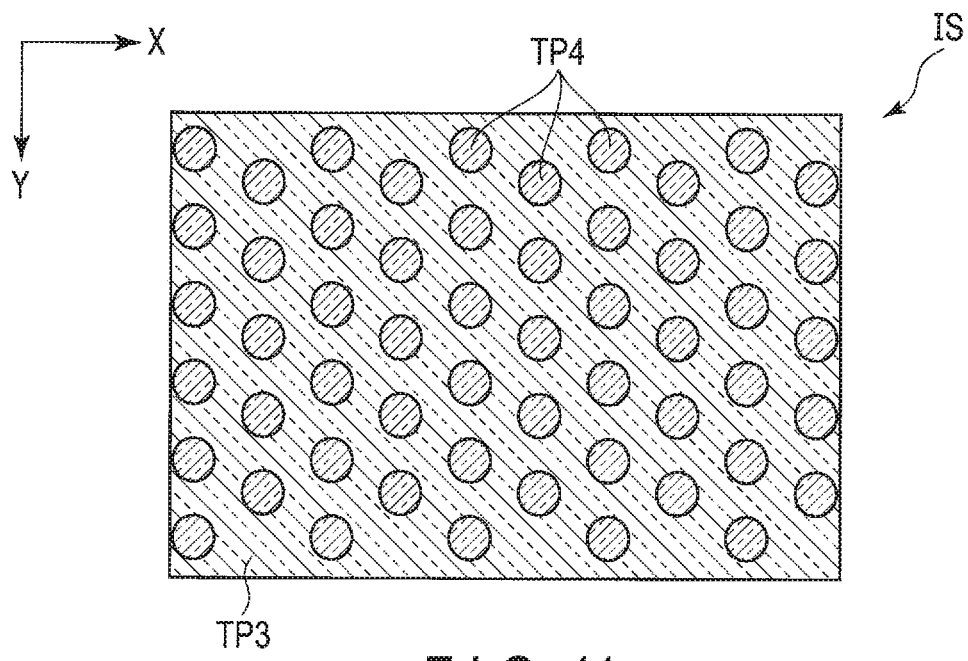
FIG. 11 is a plan view of an isotropy diffusion layer IS of FIG. 10.

FIG. 11 is a plan view of the isotropy diffusion layer IS of FIG. 10.

As shown in FIGS. 10 and 11, the transparent parts TP4 are dispersed inside the transparent part TP3. In the example depicted, the density of the transparent parts TP4 in the transparent part TP3 is substantially uniform in the first direction X and the second direction Y.

Now, an example of the structure of a segment SG of a pixel will be explained. The segment SG is a minimum unit independently driven for the image display, and in the present embodiment, the segments SG of equal number to the pixel electrodes PE are formed. For example, as will be described in embodiment 2, if a main pixel PX includes a plurality of subpixels P and each subpixel P includes a plurality of pixel electrodes PE, each subpixel P is formed of a plurality of segments SG.

Figure 12:
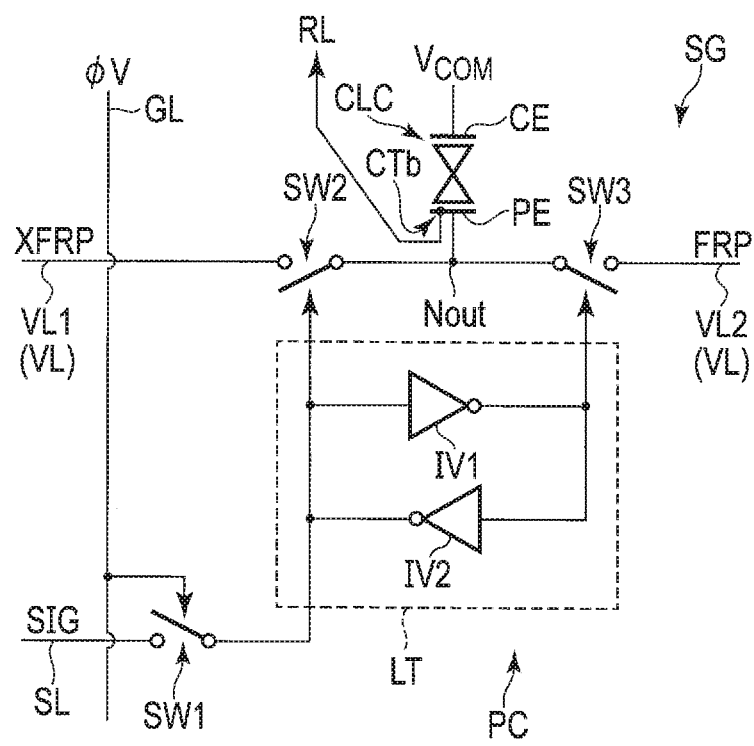
FIG. 12 shows an example of the structure of a segment SG.

FIG. 12 shows an example of the structure of a segment SG.

The segment SG includes a liquid crystal capacitance CLC and a pixel circuit PC. The liquid crystal capacitance CLC is a capacitance component of the liquid crystal layer LC produced between the pixel electrode PE and the common electrode CE. The pixel electrode PE is electrically connected to the pixel circuit PC. Furthermore, if the pixel circuit PC corresponds to the pixel circuits PC1 or PC5 of FIG. 2, the pixel electrode PE electrically connected to the relay line RL. The common electrode CE opposed to the pixel electrode PE, and is electrically connected to a common drive circuit which is not shown to receive a common voltage Vcom.

The pixel circuit PC includes three switches SW1 to SW3 and a latch LT. The switch SW1 is formed of, for example, a single n-channel MOS-TFT. The switch SW1 is electrically connected to a signal line SL at one end and is electrically connected to the latch LT at the other end. The switch SW1 is turned on/off by a scan signal supplied from the scan line GL. That is, the switch SW1 is turned on (closed) by a scan signal φV supplied from a scan line drive circuit included in the periphery circuit Cr2 or Cr4 of FIG. 1 through the scan line GL, and the switch SW1 takes in data (a signal potential corresponding to modulation) SIG supplied from a signal line drive circuit included in the periphery circuit Cr1 or Cr3 of FIG. 1 through the signal line SL.

The latch LT includes inverters IV1 and IV2 connected in an antiparallel manner. Each of the inverters IV1 and IV2 is formed of, for example, a CMOS inverter including a CMOS-TFT. The latch LT holds (latches) a potential corresponding to the data SIG taken by the switch SW1. That is, the latch LT functions as a data storage memory.

Each of the switches SW2 and SW3 is formed of, for example, a transfer switch in which an n-channel MOS-TFT and a p-channel MOS-TFT are connected in a parallel manner; however, a transistor of a different structure may be applied thereto. The switch SW2 is electrically connected to a power line VL1 at one end and receives a voltage XFRP which is a reverse phase to the common voltage Vcom. The switch SW3 is electrically connected to a power line VL2 at one end and receives a voltage FRP which is the same phase with the common voltage Vcom. The other ends of the switches SW2 and SW3 are connected together and are electrically connected to the pixel electrode PE to be an output node Nout of the pixel circuit PC. Either the switch SW2 of the switch SW3 is turned Cr corresponding to the polarity of a holding potential of the latch LT. Thus, in the liquid crystal capacitance CLC in which the common voltage Vcom is applied to the common electrode, either the same phase voltage FRP or the reverse phase voltage XFRP is applied to the pixel electrode PE through the power lines VL.

Note that the structures of the thin film transistors of the switches SW1 to SW3 and the inverters IV1 and IV2 are not limited specifically. If the semiconductor layer used therein is an oxide semiconductor, the thin film transistor can reduce a leak current. Furthermore, if the semiconductor layer used therein is a polycrystalline silicon, the thin film transistor can perform rapid switching.

Figure 13:
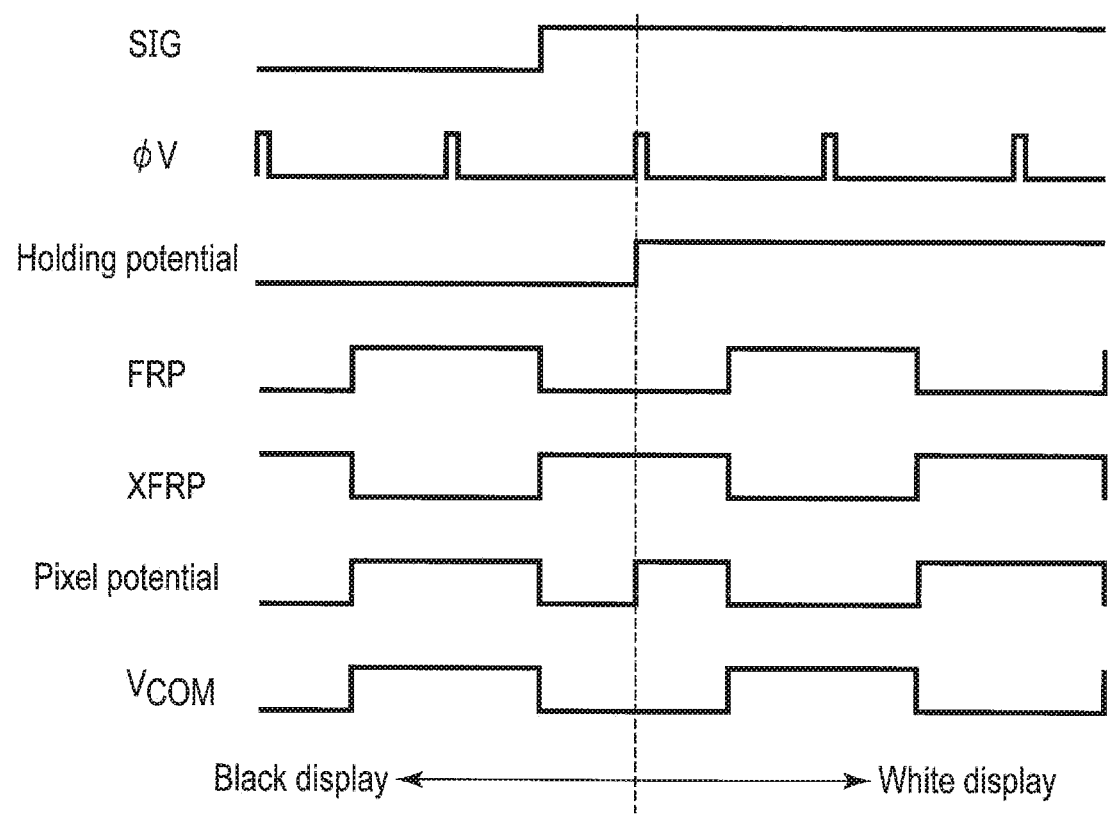
FIG. 13 is a timing chart of the operation of the segment SG of FIG. 12.

FIG. 13 is a timing chart of the operation of the segment SG of FIG. 12.

In this example, a normally black mode in which black is displayed while no voltage is applied to the liquid crystal layer LC is adopted.

In the pixel circuit PC, when a scan signal φV is supplied to the switch SW1, data SIG supplied to a signal line SL are taken in, and the latch LT holds a potential corresponding to the data SIG. If the pixel circuit PC takes in the data SIG which correspond to logic 0, the holding potential of the latch LT shows negative polarity. In that case, the switch SW2 is turned off (opened) and the switch SW3 is turned on (closed), the voltage FRP which is the same phase as the common voltage Vcom is applied to the pixel electrode PE. Thus, the pixel potential of the pixel electrode PE becomes equal to the common voltage Vcom of the common electrode CE. Thus, a voltage is not applied to the liquid crystal layer LC and the segment SG displays black.

On the other hand, if the pixel circuit PC takes in data SIG corresponding to logic 1, the holding potential of the latch LT shows positive polarity. In that case, the switch SW3 is turned off (opened) and the switch SW2 is turned on (closed), and the voltage XFRP which is a reverse phase to the common voltage Vcom is applied to the pixel electrode PE. Thus, a potential difference is produced between the pixel potential of the pixel electrode PE and the common voltage Vcom of the common electrode CE. That is, a voltage is applied to the liquid crystal layer LC. Thus, light passing through the liquid crystal layer LC is modulated and is partly used for the image display, and the segment SG displays white.

As can be understood from the above, in the present embodiment, a memory in the pixel circuit PC can store binary data (logic 1/logic 0) and the modulation can be displayed digitally on the basis of the binary data. When the modulation display is performed in a MIP type display device using binary data, an area coverage modulation method in which one subpixel is formed of a plurality of segments SG and the modulation display is achieved by a combination of areas of the segments SG may be adopted, for example. Here, the area coverage modulation method is, for example, a modulation display method which achieves 2n modulations with N segments SG an area ratio of which is weighed such as $2^0, 2^1, 2^2, \ldots, 2^{n-1}$.

With such an MIP method, the modulation of subpixels is displayed using the data stored in the memory, and thus, a write operation of a signal potential corresponding to the modulation to each pixel in a frame period is not necessary. Thus, the power used by the display device DSP can be decreased.

Furthermore, in the display screen on the display area DA, rewrite of only partial pixels may be required. In such a case, the signal potential of the segments SG is partly rewritten. That is, data are transferred to the pixel circuits PC of the segments SG to be rewritten, and no data transfer is required to the pixel circuits PC of the segments SG to be maintained. Thus, the data transfer can be reduced and the power used by the display device DSP can further be decreased.

Furthermore, in the structure adopting the MIP method, either one of the switch SW2 or the switch SW3 is turned on corresponding to the polarity of the holding potential of the latch LT, and a voltage FRP of the same phase or a voltage XFRP of the reverse phase is applied to the pixel electrode PE. Thus, a constant voltage is applied to the segment SG, and shading can be suppressed.

In this example, the display device DSP includes a pixel electrode PE1 overlapping a pixel circuit PC1, a pixel electrode PE2 overlapping a periphery circuit Cr1, and a relay line RL1 configured to electrically connect the pixel electrode PE1 and the pixel electrode PE2. Thus, even the area overlapping the periphery circuit Cr1 can be used for the image display. Furthermore, the display device DSP includes a pixel electrode PE3 arranged linearly with the pixel electrodes PE1 and PE2, and the pixel electrode PE3 is electrically connected to the relay line RL1. As can be understood from the above, since the relay line RL1 is disposed between the pixel circuit PC1 and the pixel electrode PE1 and between the periphery circuit Cr1 and the pixel electrode PE2, the pixel electrodes PE1 to PE3 can be electrically connected by simply overlapping the relay line RL1, and the shape thereof can be similar to a pixel electrode PE4 which does not overlap the relay line RL in a plan view. That is, the display device DSP can easily establish the electrical connection between three or more pixel electrodes PE with the relay line RL.

Furthermore, for example, insulating films 13 and 14 are disposed between the pixel circuit PC and the pixel electrode PE, and the relay line RL is disposed between the insulating film 13 and the insulating film 14. In that case, the connector CT electrically connects the pixel circuit PC and the pixel electrode PE, and an upper connector CTb electrically connects the relay line RL and the pixel electrode PE. In such a structure, the relay line RL1 is not required to bypass the pixel electrodes PE1 to PE3 and lines of the pixel circuit PC1 in a plan view, and can be disposed regardless of the positions of the pixel circuit PC1 and the pixel electrodes PE1 to PE3. Furthermore, for example, an upper connector CTb1 is apart from the connector CT1 and may be apart from the pixel circuit PC1 in a plan view. That is, the layout of the relay line RL1 can be determined more freely in the display device DSP.

The display device DSP includes a light shield SH, and the light shield SH overlaps a gap between pixel electrodes PE1 and PE5, the light shield SH can shield external light which may enter a thin film transistor of the pixel circuit PC and causes an error. Thus, the display quality of the display device DSP can be improved.

Furthermore, the light shield SH is apart from the relay line RL and is disposed between the insulating film 13 and the insulating film 14 as with the relay line RL. Thus, the light shield SH and the relay line RL can be manufactured through the same process at the same tame, and thus, the production cost of the display device DSP can be suppressed.

As can be understood from the above, the present embodiment can provide a display device DSP of thin bezel structure.

[Variation 1]

Figure 14:
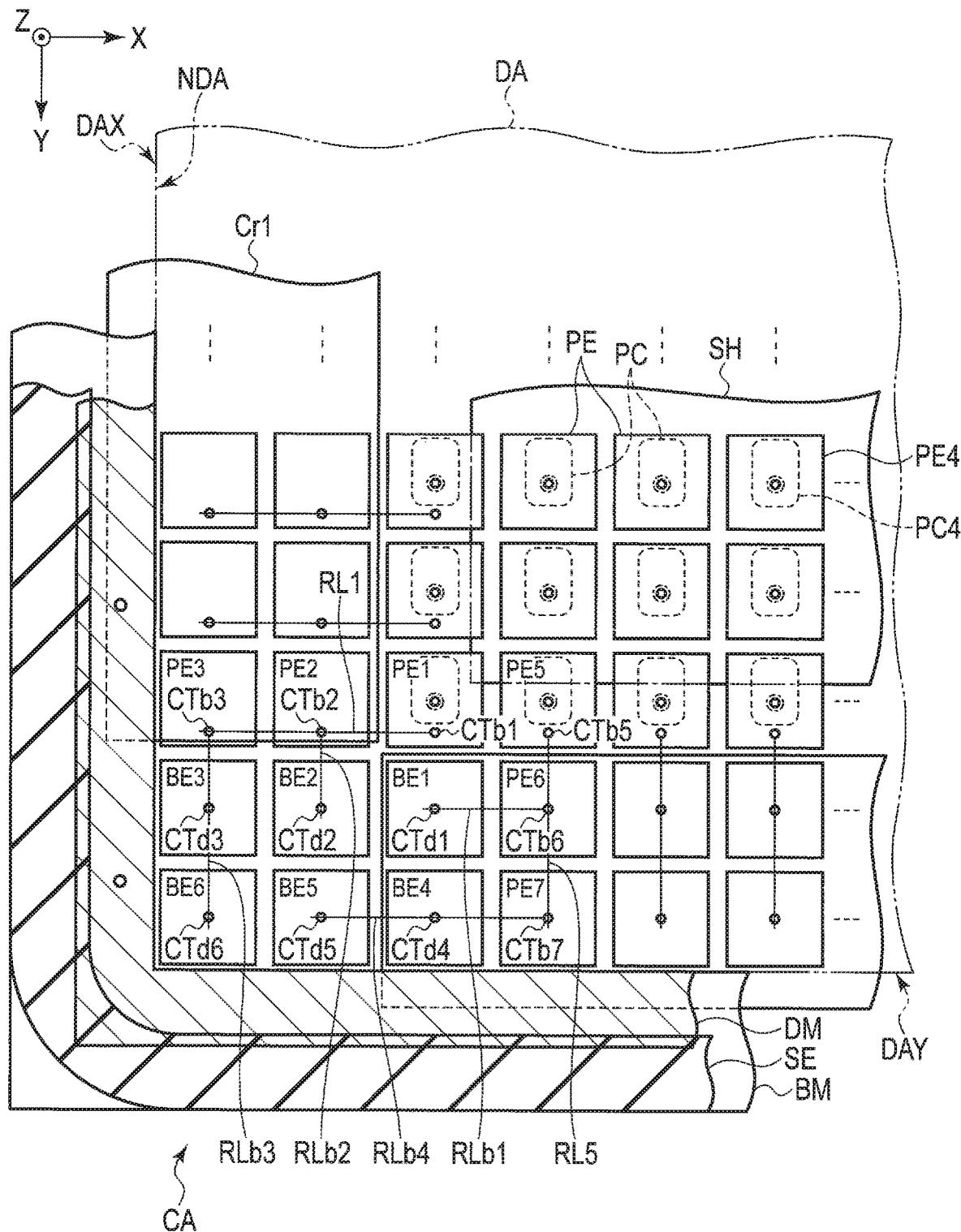
FIG. 14 is a plan view showing a variation 1 of the embodiment 1.

FIG. 14 is a plan view of a variation 1 of the embodiment 1.

In this variation, pixel electrodes BE1 to BE6 and relay lines RLb1 to RLb4 are included in the structure. In this respect, the structure of the variation 1 differs from the structure of FIG. 2.

Pixel electrodes BE1 to BE3 are arranged in the first direction X. The pixel electrode BE1 is adjacent to the pixel electrodes PE1 and PE6, is closer to an outer edge DAX than is the pixel electrode PE6, and is closer to an outer edge DAY than is the pixel electrode PE1. The pixel electrode BE2 is adjacent to the pixel electrodes PE2 and BE1, is closer to the outer edge DAX than is the pixel electrode BE1, and is closer to the outer edge DAY than is the pixel electrode PE2. The pixel electrode BE3 is adjacent to the pixel electrodes PE3 and BE2, is closer to the outer edge DAX than is the pixel electrode BE2, and is closer to the outer edge DAY than is the pixel electrode PE3. The pixel electrodes BE4 to BE6 are arranged in the first direction X and are adjacent to the pixel electrodes BE1 to BE3 in the second direction Y, respectively.

Relay lines RLb1 to RLb4 are disposed between the insulating film 13 and the insulating film 14 as with the relay lines RL1 to RL5. An upper connector CTd1 is disposed in an area where the relay line RLb1 and the pixel electrode BE1 overlap with each other. An upper connector CTd2 is disposed in an area where the relay line RLb2 and the pixel electrode BE2 overlap with each other. An upper connector CTd3 is disposed in an area where the relay line RLb3 and the pixel electrode BE3 overlap with each other, and an upper connector CTd6 is disposed in an area where the relay line RLb3 and the pixel electrode BE6 overlap with each other. An upper connector CTd4 is disposed in an area where the relay line RLb4 and the pixel electrode BE4 overlap with each other, and an upper connector CTd5 is disposed in an area where the relay line RLb4 and the pixel electrode BE5 overlap with each other. The upper connectors CTd1 to CTd6 penetrate the insulating film 14 as with the upper connectors CTb.

The relay line RLb1 crosses the relay line RL5 to be electrically connected thereto and extends in the first direction X. The relay line RLb1 and the pixel electrode BE1 are electrically connected through the upper connector CTd1. The relay line RLb4 crosses the relay line RL5 to be electrically connected thereto and extends in the first direction X. The relay line RLb4 and the pixel electrode BE4 are electrically connected through the upper connector CTd4, and the relay line RLb4 and the pixel electrode BE5 are electrically connected through the upper connector CTd5. That is, the pixel electrodes BE1, BE4, and BE5 are electrically connected to the pixel electrode PE5 through the pixel electrodes PE6 and PE7, and are driven in synchronization with the pixel electrode PE5.

The relay line RLb2 crosses the relay line RL1 to be electrically connected thereto and extends in the second direction Y. The relay line RLb2 and the pixel electrode BE2 are electrically connected through the upper connector CTd2. The relay line RLb3 crosses the relay line RL1 to be electrically connected thereto and extends in the second direction Y. The relay line RLb3 and the pixel electrode BE3 are electrically connected through the upper connector CTd3, and the relay line RLb3 and the pixel electrode BE3 are electrically connected through the upper connector CTd6. That is, the pixel electrodes BE2, BE3, and BE6 are electrically connected to the pixel electrode PE1 through the pixel electrodes PE2 and PE3, and are driven in synchronization with the pixel electrode PE1.

In the example depicted, the crossing position of the relay line RLb1 and the relay line RL5 is the upper connector CTb6, and the crossing position of the relay line RLb4 and the relay line RL5 is the upper connector CTb7. Furthermore, the crossing position of the relay line RLb2 and the relay line RL1 is the upper connector CTb2 and the crossing position of the relay line RL3 and the relay line RL1 is the upper connector CTb3. However, the above crossing positions are not limited, and they may be apart from the upper connectors CTb.

Furthermore, the connection relationship between the pixel electrodes BE and the pixel electrodes PE as depicted is merely an example, and the pixel electrodes BE1 to BE6 should be electrically connected to any one of the pixel electrodes PE1 to PE3, or PE6, or PE7. For example, the pixel electrodes BE1 to BE6 may all be electrically connected to the pixel electrode PE1 and driven in synchronization with the pixel electrode PE1.

In this variation, the same advantages achieved in the example of FIG. 2 can be achieved. Furthermore, in this variation, even the pixel electrodes BE which are not arranged linearly with the pixel circuits PC in the first direction N or in the second direction Y can be driven by the pixel circuits PC. That is, even the corner of the display area DA where the outer edge DAX and the outer edge DAY cross can be used for the image display.

Now, an example of the structure of the display device DSP to which the area coverage modulation method is applied in the present embodiment will be explained. Note that, in the following description, the structures which have already been described in the embodiment 1 will be omitted. Furthermore, an embodiment 2 and its variation can achieve the same advantages obtained in the embodiment 1.

Embodiment 2

Figure 15:
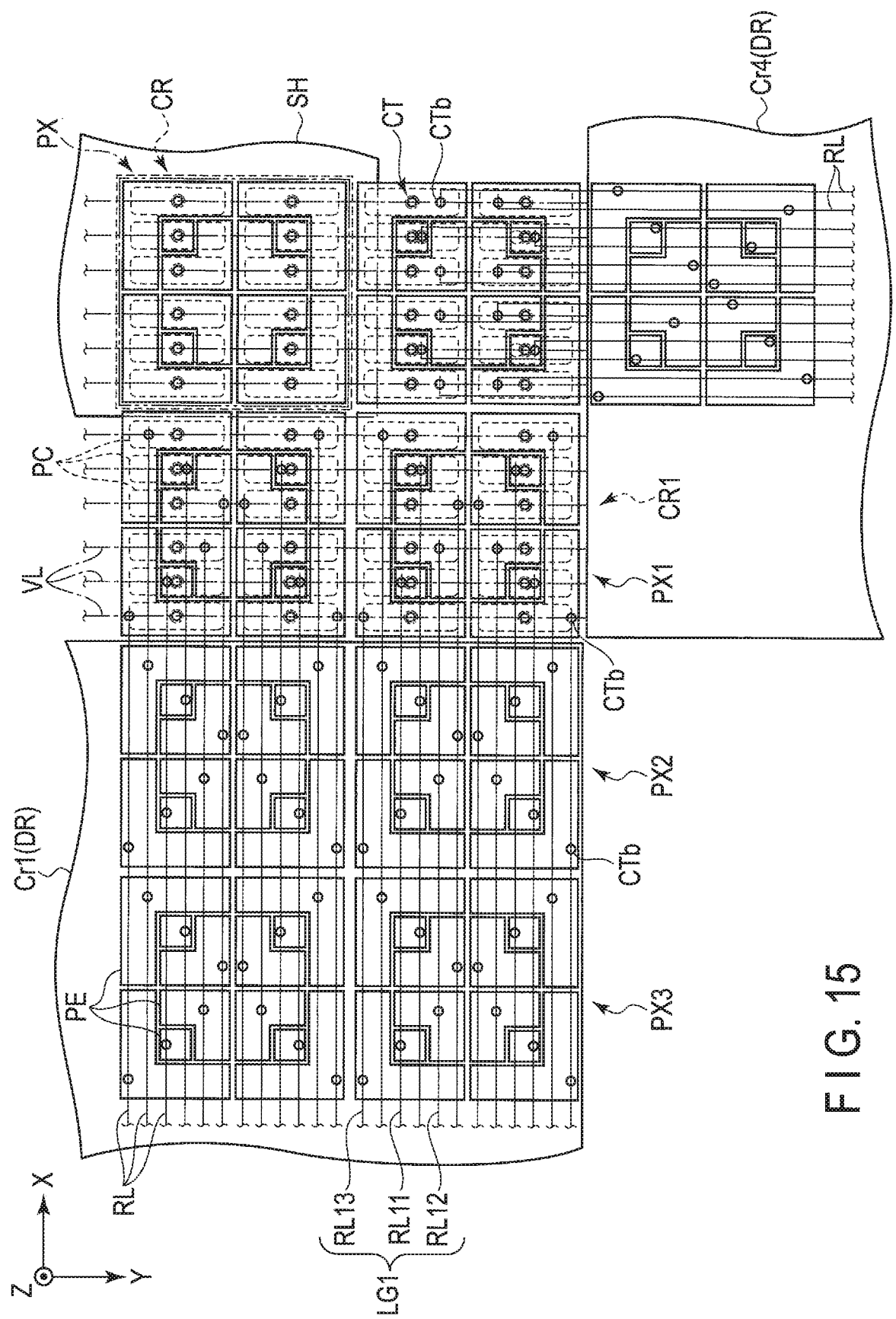
FIG. 15 is a plan view showing an example of the structure of main pixels PX, and main pixel circuits CR.

FIG. 15 is a plan view of an example of the structure of main pixels PX and main pixel circuits CR.

FIG. 15 shows an area CA in an enlarged manner. A positional relationship and a connection relationship between structural elements in a plan view will be explained with reference to FIGS. 15 to 21.

The display device DSP includes a plurality of main pixels PX and a plurality of main pixel circuits CR each configured to drive the main pixels PX. The main pixel PX corresponds to an area in a minimum unit for the image display. The main pixel PX is, in the example depicted, formed as a square having substantially the same lengths in the first direction X and the second direction Y. The shape thereof is not limited specifically, and the main pixel PX may have a different shape such as a polygon or a circle.

The main pixel PX includes a plurality of pixel electrodes PE and the main pixel circuit CR includes a plurality of pixel circuits PC. In this figure, as a specific example of various lines extending from the driver DR to be connected to each pixel circuit PC, power lines VL are depicted. The power lines VL extend from the periphery circuit Cr4 in the second direction Y and overlap the pixel electrodes PE and the pixel circuits PC in a plan view. The power lines VL are apart from the relay lines RL in the third direction Z, and thus, they can be disposed to cross the relay lines RL in a plan view.

A main pixel circuit CR1 is apart from the driver DR and is adjacent to the periphery circuit Cr1 in the first direction X. The main pixel PX1 overlaps the main pixel circuit CR1, and the pixel electrodes PE of the main pixel PX1 are each electrically connected to the pixel circuits PC of the main pixel circuit CR1. The main pixels PX2 and PX3 overlap the periphery circuit Cr1 and are arranged along the main pixel PX1 in the first direction X. The main pixel PX2 is adjacent to the main pixel PX1 and is closer to the outer edge DAX than is the main pixel PX1. The main pixel PX3 is adjacent to the main pixel PX2 and is closer to the outer edge DAY than is the main pixel PX2. The line group LG1 includes relay lines RL11 to RL13 and electrically connects the pixel electrodes PE of the main pixels PX1 to PX3 together.

In the area corresponding to the main pixel PX1, the power lines VL and the relay lines RL are disposed. In the area corresponding to the main pixels PX which are disposed further inside the driver DR than is the main pixel PX1, the power lines VL are disposed and no relay line RL is disposed. In the area corresponding to the main pixels PX2 and PX3, no power line VL is disposed and the relay lines RL are disposed. The power lines VL extend in the second direction Y and the relay lines RL disposed in the area corresponding to the main pixels PX1 to PX3 extend in the first direction X. Thus, the density and directions of lines overlapping the pixel electrodes PE differ in positions, and the surface formation of the pixel electrodes PE differs in positions of the pixel electrodes PE. This may cause unevenness in light reflection by the pixel electrodes PE. However, since the display device DSP includes the diffusion layer FS of FIGS. 7 to 11, light reflected by the pixel electrodes PE can be diffused and the unevenness in the image display can be suppressed.

The main pixel PX1 overlaps an end of the light shield SH. Furthermore, the light shield SH overlaps a gap between the main pixels PX disposed in the side apart from the periphery circuit Cr1 of the main pixel PX1. That is, the light shield SH overlaps a gap between an electrode group EG2 disposed further inside the driver DR than is the main pixel PX1 which will be described layer and an electrode group EG adjacent to the electrode group EG2 in the opposite side to the electrode group EG1.

Figure 16:
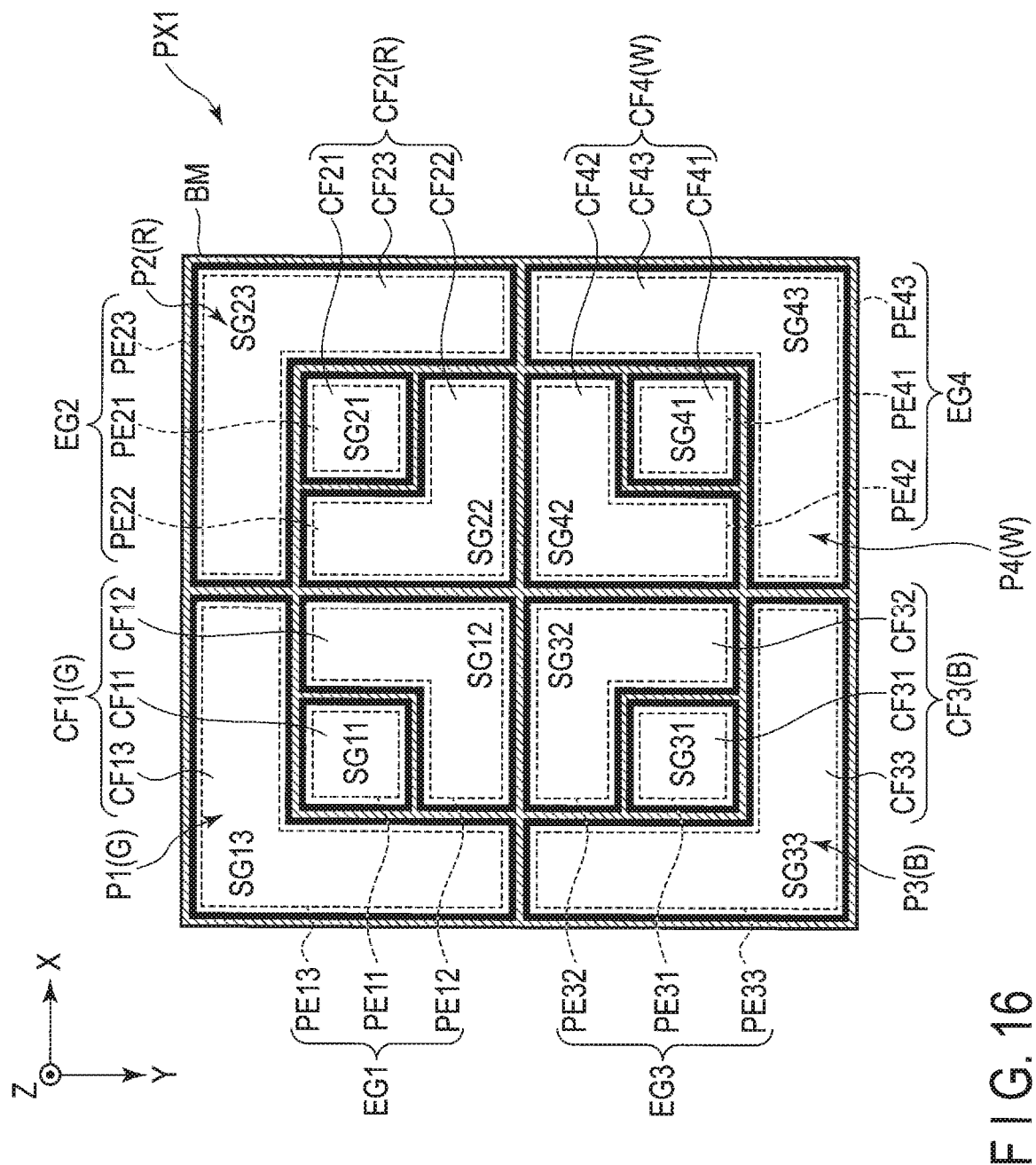
FIG. 16 is a plan view in which a positional relationship between pixel electrodes and color filters in a main pixel PX1 of FIG. 15 is illustrated.

FIG. 16 is a plan view showing a positional relationship between pixel electrodes and color filters in the main pixel PX1 of FIG. 15.

The main pixel PX1 includes subpixels P1, P2, P3, and P4 brightness of which is controlled by area coverage modulation. The subpixels P1 to P4 display different colors. The main pixel PX1 is defined by the light shielding layer BM. The subpixels P1 to P4 are each defined by the light shielding layer BM. The subpixels P1 to P4 are each shaped as a quadrangle and their areas are substantially the same. In the example depicted, the subpixels P1 to P4 are each a square having substantially the same lengths in the first direction X and the second direction Y.

The subpixels P1 and P2 are arranged in the first direction X. The subpixels P3 and P4 are arranged in the first direction X. Furthermore, the subpixels P1 and P3 are arranged in the second direction Y. The subpixels P2 and P4 are arranged in the second direction Y. In the example depicted, the subpixel P1 is a G pixel of green (G), the subpixel P2 is an R pixel of red (R), the subpixel P3 is a B pixel of blue (B), and the subpixel P4 is a W pixel of white (W).

The subpixel P1 is adjacent to the subpixel P2 in the first direction X and is adjacent to the subpixel P3 in the second direction Y. The subpixels P4 and P1 are disposed diagonally, and the subpixel P4 is adjacent to the subpixel P3 in the first direction X and is adjacent to the subpixel P2 in the second direction Y. Note that the colors corresponding to the subpixels P1 to P4 in the figure are examples, and colors corresponding to the subpixels may be changed. However, B pixel and W pixel are, preferably, arranged to be adjacent to each other. Furthermore, R pixel and G pixel are, preferably, arranged to be adjacent to each other.

Each of the subpixels P1 to P4 includes three segments SG to display a three bit modulation. In this example, a display area of each segment SG corresponds to an area including pixel electrodes PE corresponding to each segment SG and defined by the light shielding layer BM. The area of each segment SG is an area of the display area of each segment SG.

In the main pixel PX1, the subpixels P1 to P4 have a similar structure. The structure of each subpixel will now be described specifically. Note that only the subpixel P1 will be explained and the description of the subpixels P2 to P4 will be omitted.

The subpixel P1 includes three segments SG11 to SG13 for image display of three bit modulation. The subpixel P1 includes an electrode group EG1 of three pixel electrodes PE11 to PE13. The pixel electrode PE11 is disposed in the display area of the segment SG11, the pixel electrode PE12 is disposed in the display area of the segment SG12, and the pixel electrode PE13 is disposed in the display area of the segment SG13. In a plan view, the pixel electrodes PE11 to PE13 are opposed to each other through the light shielding layer BM.

The area of the segment SG11 is a display area corresponding to the lowest bit (for example, 20) of the three bit area coverage modulation. The area of the segment SG13 is a display area corresponding to the highest bit (for example, 22) of the three bit area coverage modulation. The area of the segment SG12 is a display area corresponding to a middle bit (for example, 21) of the three bit area coverage modulation. A combination of the segments SG11 to SG13 can achieve the three bit area coverage modulation image display.

The area of the segment SG12 is greater than the area of the segment SG11, and the area of the segment SG13 is greater than the area of the segment SG12. Similarly, the area of the pixel electrode PE12 is greater than the area of the pixel electrode PE11, and the area of the pixel electrode PE13 is greater than the area of the pixel electrode PE12. An area ratio between the segments SG11, SG12, and SG13 is, for example, 1:2:4 (=20:21:22). Or, an area ratio between the pixel electrodes PE11, PE12, and PE13 is, for example, 1:2:4 (=20:21:22). Note that a combination of the area ratio between the pixel electrodes PE11 to PE13 or a combination of the area ratio between the segments SG11 to SG13 is not limited to the above examples.

The subpixel P1 includes a color filter CF1 formed of color filters CF11 to CF13, and the color filter CF1 is, for example, a green color filter. In the third direction Z, the color filter CF1 is opposed to the electrode group EG1 and the color filters CF11 to CF13 are opposed to the pixel electrodes PE11 to PE13, respectively. In a plan view, the light shielding layer BM is disposed between the color filters CF11 to CF13. For example, the color filters CF11 to CF13 are formed individually and opposed ends thereof overlap the light shielding layer BM in a plan view. The color filters CF11 to CF13 may be formed integrally. Note that the electrode group EG1 and the color filter CF1 overlap the main pixel circuit CR1 in a plan view.

The subpixel P2 is formed of segments SG21 to SG23 and includes an electrode group EG2 formed of pixel electrodes PE21 to PE23. The subpixel P2 formed of color filters CF21 to CF23 and includes a red color filter CF2 overlapping the electrode group EG2. The subpixel P3 is formed of segments SG31 to SG33 and includes an electrode group EG3 formed of pixel electrodes PE31 to PE33. The subpixel P3 is formed of color filters CF31 to CF33 and includes a blue color filter CF3 overlapping the electrode group EG3. The subpixel P4 is formed of segments SG41 to SG43 and includes an electrode group EG4 formed of pixel electrodes PE41 to PE43. The subpixel P4 is formed of color filters CF41 to CF43 and includes a white color filter CF4 overlapping the electrode group EG4.

Note that, if the colors of the subpixels P1 to P4 are different from red, green, blue, and white, the colors of the color filters CF1 to CF4 are changed suitably.

Figure 17:
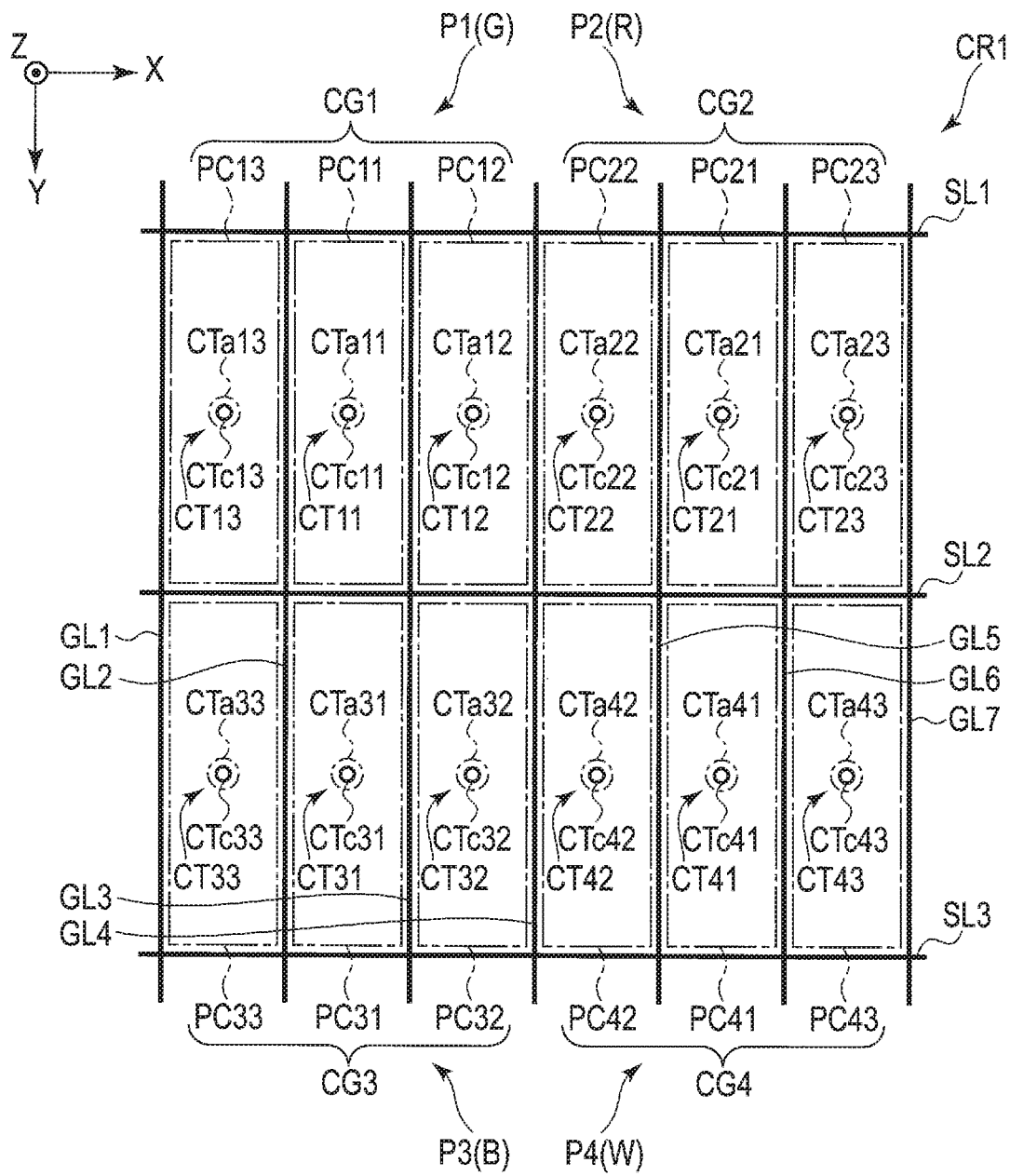
FIG. 17 is a schematic view showing an example of the structure of circuit groups CG1 to CG4 in a main pixel circuit CR1 of FIG. 15.

FIG. 17 is a schematic view of an example of the structure of circuit groups CG1 to CG4 in the main pixel circuit CR1 of FIG. 15.

Here, the pixel circuits PC are each formed an area depicted by a dotted line in the figure, and the specific structure thereof will be omitted, and any structure which can achieve the equivalent circuit of FIG. 12 can be adopted in the example depicted, the pixel circuits PC arranged in the first direction X have the structure of the same layout. Furthermore, pixel circuits PC adjacent to each other in the second direction Y are symmetric with each other about an axis which is a straight line extending in the first direction. In the example depicted, the axis is the signal line S12. For example, one pixel circuit PC is formed in an area defined by two signal lines SL adjacent to each other and two scan lines GL adjacent to each other; however, no limitation is intended thereby, and one pixel circuit PC may be formed in an area defined by other lines such as power lines VL used to supply a voltage FRP or a voltage XFRP.

The pixel circuits PC11 to PC13 and the pixel circuits PC21 to PC23 are formed in an area having its sides in the first direction X which are less than its sides in the second direction Y and are arranged in the first direction X. The pixel circuits PC31 to PC33 and the pixel circuits PC41 to PC43 are formed in an area having its sides in the first direction X which are less than its sides in the second direction Y and are arranged in the first direction X.

The pixel circuit PC11 is disposed between the pixel circuit PC12 and the pixel circuit PC13, and the pixel circuit PC21 is disposed between the pixel circuit PC22 and the pixel circuit PC23. The pixel circuit PC12 and the pixel circuit PC22 are adjacent to each other and are disposed between the pixel circuit PC11 and the pixel circuit PC21. The pixel circuit PC31 is disposed between the pixel circuit PC32 and the pixel circuit PC33, and the pixel circuit PC41 is disposed between the pixel circuit PC42 and the pixel circuit PC43. The pixel circuit PC32 and the pixel circuit PC42 are adjacent to each other and are disposed between the pixel circuit PC31 and the pixel circuit PC41.

The pixel circuits PC11 to PC13 form a circuit group C1 which drives the electrode group EG1 of the subpixel P1. The pixel circuits PC21 to PC23 form a circuit group CG2 which drives the electrode group EG2 of the subpixel P2. The pixel circuits PC31 to PC33 form a circuit group CG3 which drives the electrode group CG3 which drives the electrode group EG3 of the subpixel P3. The pixel circuits PC41 to PC43 form a circuit group CG4 which drives the electrode group EG4 of the subpixel P4. The circuit group CG1 is disposed in the subpixel P1 and overlaps the electrode group EG1, the circuit group CG2 is disposed in the subpixel P2 and overlaps the electrode group EG2, the circuit group CG3 is disposed in the subpixel P3 which drives the electrode group EG3, and the circuit group CG4 is disposed in the subpixel P4 and overlaps the electrode group EG4.

In the circuit group CG1, in the areas corresponding to the pixel circuits PC11 to PC13, the lower connectors CTa11 to CTa13 and the upper connectors CTc11 oil to CTc13 are disposed, respectively. The lower connectors CTa11 to CTa13 are disposed in the center parts of the pixel circuits PC11 to PC13, respectively, and are arranged in the first direction X. The upper connectors CTc11 to CTc13 are disposed in the areas overlapping the lower connectors CTa11 to CTa13. The lower connectors CTa11 and the upper connectors CTc11 correspond to the connector CT11, the lower connector CTa12 and the upper connector CTc12 correspond to the connector CT12, and the lower connector CTa13 and the upper connector CTc13 correspond to the connector CT13.

The detailed description of the structure of pixel circuits PC in circuit groups CG2 to CG4 is omitted. The circuit group CG2 has the same layout as the circuit group CG1. Furthermore, the circuit groups CG3 and CG4 have symmetric layouts about the signal line SL2 as the axis. That is, the connectors CT21 to CT23 disposed in the circuit group CG2 are arranged in the first direction X and the connectors CT11 to CT13 and CT21 to CT23 are arranged linearly. The connectors CT31 to CT33 disposed in the circuit group CG3 are disposed in the center parts of the pixel circuits PC31 to PC33, respectively, and are arranged in the first direction X. The connectors CT41 to CT43 disposed in the circuit group CG4 are disposed in the center parts of the pixel circuits PC41 to PC43, respectively, and are arranged in the first direction X. The connectors CT31 to C133 and CT41 to C143 are arranged linearly in the first direction X.

Note that the position of the connectors CT are not limited, and for example, the connectors CT11 to CT13 and CT21 to CT23 may be arranged in the edge of each pixel circuit PC in the side closer to the circuit groups CG3 and CG4, or may be disposed in the edge in the opposite side thereof. That is, the connectors CT11 to CT13 and CT21 to CT23 may be disposed in the proximity of either the signal line SL1 or the signal line SL2.

Figure 18:
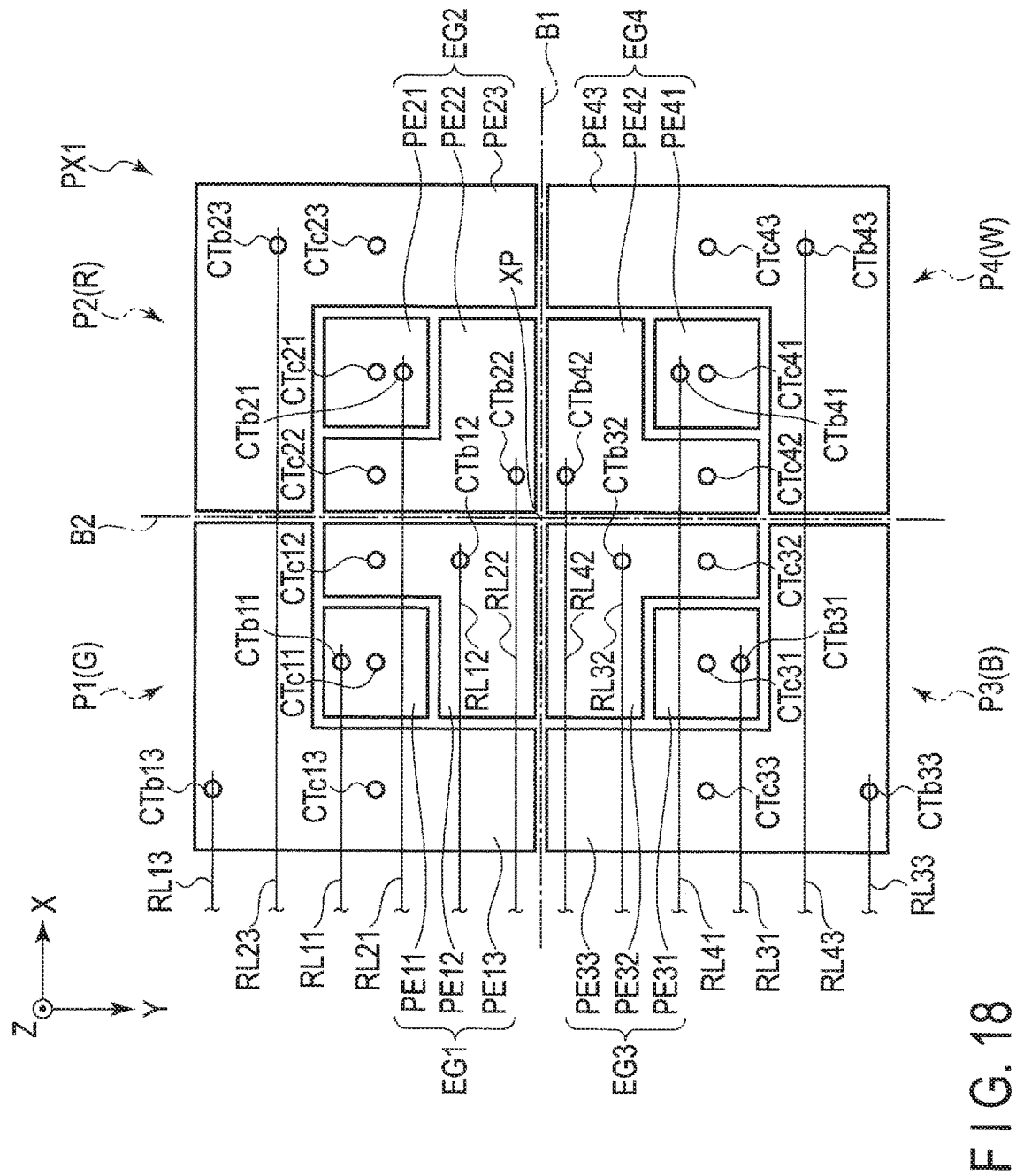
FIG. 18 is a plan view showing an example of the structure of electrode groups EG1 to EG4 in the main pixel PX1 of FIG. 15.

FIG. 18 is a plan view of an example of the structure of electrode groups EG1 to EG4 in the main pixel PX1 of FIG. 15.

The main pixel PX1 extends in the first direction X and includes a boundary line B1 between the subpixels P1 and P3 and between the subpixels P2 and P4. Furthermore, the main pixel PX1 extends in the second direction Y and includes a boundary line B2 between the subpixels P1 and P2 and between the subpixels P2 and P4. The layout of the electrode groups EG1 to EG4 is not limited specifically, and in the example depicted, the electrode groups EG3 and EG4 have a symmetric layout to the electrode groups EG1 and EG2 about the boundary line B1 as the axis. The electrode groups EG2 and EG4 have a symmetric layout to the electrode groups EG1 and EG3 about the boundary line B2 as the axis. Furthermore, the electrode groups EG1 to EG4 have a symmetric layout with each other with respect to a crossing point XP of the boundary lines B1 and B2.

Now, the structure of the electrode group EG1 will be explained with reference to the subpixel P1. The description of the structure of the electrode groups EG2 to EG4 will be omitted.

The pixel electrode PE11 is smallest in size among the three pixel electrodes PE11 to PE13. The pixel electrode PE11 is a quadrangle and is disposed in the center of the subpixel P1. The middle-sized pixel electrode PE12 is formed as a letter L extending along two crossing sides of the pixel electrode PE11. The largest pixel electrode PE13 is formed as a letter L extending along other two crossing sides of the pixel electrode PE11. The pixel electrode PE12 is disposed in the side closer to the crossing point XP of the pixel electrode PE11, and the pixel electrode PE13 is disposed in the far side from the crossing point XP of the pixel electrode PE11. The pixel electrodes PE12 and PE13 are adjacent to the boundary lines B1 and B2.

The figure formed by the pixel electrodes PE11 and PE12, which is a quadrangle, is a similar figure of the pixel electrode PE11. The figure formed by the pixel electrodes PE11 to PE13, which is a quadrangle, is a similar figure of the figure formed by the pixel electrodes PE11 and PE12, which is a quadrangle. Thus, a shape change in the luminous area of the subpixel P1 in the middle modulation can be suppressed.

The pixel electrodes PE11 to PE13 include areas in the first direction X, and the upper connectors CTc11 to CTc13 are disposed in the areas of the pixel electrodes PE11 to PE13 in the first direction X. The pixel electrode PE11 is electrically connected to the pixel circuit PC11 of FIG. 17 through the upper connector CTc11 (connector CT11). The pixel electrode PE12 is electrically connected to the pixel circuit PC12 of FIG. 17 through the upper connector CTc12 (connector CT12). The pixel electrode PE13 is electrically connected to the pixel circuit PC13 of FIG. 13 through the upper connector CTc13 (connector CT13).

The upper connectors CTb11 to CTb13 are, in a plan view, disposed to overlap the pixel electrodes PE11 to PE13, respectively, and are each apart from the upper connectors CTc11 to CTc13 in the second direction Y. The relay line RL11 and the pixel electrode PE11 are electrically connected through the upper connector CTb11, the relay line RL12 and the pixel electrode PE12 are electrically connected through the upper connector CTb12, and the relay line RL13 and the pixel electrode PE13 are electrically connected through the upper connector CTb13. That is, the electrode group EG1 is electrically connected to the line group LG1.

The upper connectors CTb11 to CTb13 are apart from each other in the second direction Y. The upper connectors CTb21 to CTb23 disposed in the electrode group EG2 are apart from each other in the second direction Y as well. The upper connectors CTb11 to CTb13 and CTb21 to CTb23 are apart from each other in the second direction Y. The upper connectors CTb31 to CTb33 and CTb41 to CTb43 disposed in the electrode groups EG3 and EG4 are apart from each other in the second direction Y. Thus, the relay lines RL can be formed linearly in the first direction X without bending.

Figure 19:
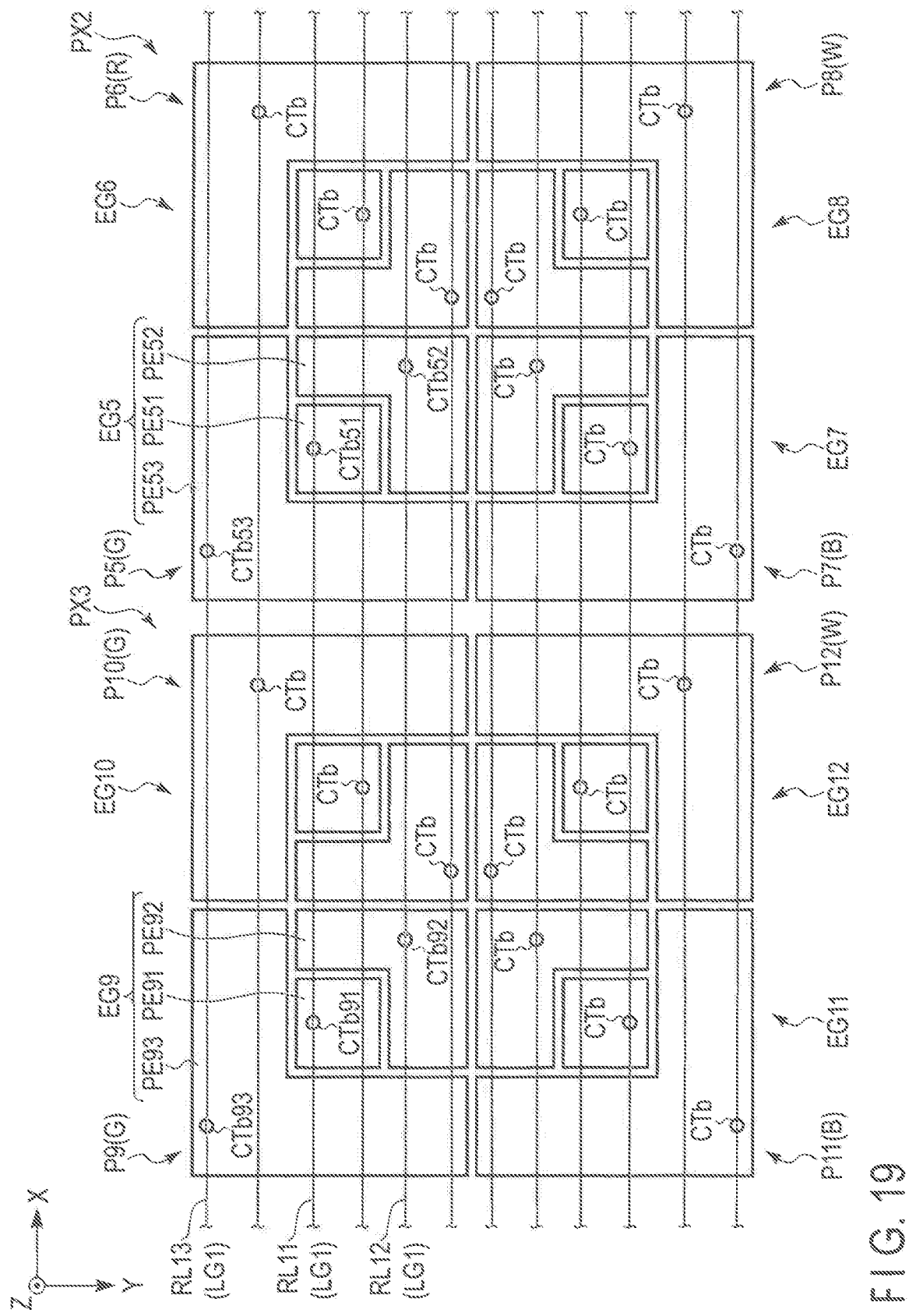
FIG. 19 is a plan view showing an example of the structure of main pixels PX2 and PX3 of FIG. 15.

FIG. 19 is a plan view of an example of the structure of the main pixels PX2 and PX3 of FIG. 15. In this example, the main pixels PX2 and PX3 have the same structure as the main pixel PX1. The main pixel PX2 includes subpixels P5 to P8, and the main pixel PX3 includes subpixels P9 to P12. In the example depicted, the subpixels P5 and P9 are G pixels which have the same color as with the subpixel P1, the subpixels P6 and P10 are R pixels which have the same color as with the subpixel P2, the subpixels P7 and P11 are B pixels which have the same color as with the subpixel P3, and the subpixels P8 and P12 are W pixels which have the same color as with the subpixel P4.

The subpixels P5 to P8 include electrode groups EG5 to EG8, respectively, and the subpixels P9 to P12 include electrode groups EG9 to EG12, respectively. The electrode groups EG5 and EG9 have the same structure as the electrode group EG1 and are opposed to the color filters of the same color as the color filter CF1 of FIG. 16. The electrode groups EG6 and EG10 have the same structure as the electrode group EG2 and are opposed to the color filters of the same color as the color filter CF2 of FIG. 16. The electrode groups EG7 and EG11 have the same structure as the electrode group EG3 and are opposed to the color filters of the same color as the color filter CF3 of FIG. 16. The electrode groups EG8 and EG12 have the same structure as the electrode group EG4 and are opposed to the color filters of the same color as the color filter CF4 of FIG. 16.

Now, the structure and connection relationship between pixel electrodes PE of the electrode groups EG1, EG5, and EG9 will be explained with reference to the subpixels P1, P5, and P9. The description of the connection relationship between pixel electrodes PE of other electrode groups EG will be omitted.

The electrode group EG5 includes a pixel electrode PE51, pixel electrode PE52 which is greater than the pixel electrode PE51 in size, and pixel electrode PE53 which is greater than the pixel electrode PE52. The electrode group FG9 includes a pixel electrode PE91, pixel electrode PE92 which is greater than the pixel electrode PE91 in size, and pixel electrode PE93 which is greater than the pixel electrode PE92 in size. The electrode groups EG5 and EG9 are electrically connected to the electrode group EG1 through the line group LG1. The relay line RL11 and the pixel electrode PE51 are electrically connected through the upper connectors CTb51, the relay line RL12 and the pixel electrode PE52 are electrically connected through the upper connector CTb52, and the relay line RL13 and the pixel electrode PE53 are electrically connected through the upper connector CTb53. The relay line RL11 and the pixel electrode PE91 are electrically connected through the upper connector CTb91, the relay line RL12 and the pixel electrode PE92 are electrically connected through the upper connector CTb92, and the relay line RL13 and the pixel electrode PE93 are electrically connected through the upper connector CTb93.

That is, the relay line RL11 electrically connects pixel electrodes PE11, PE51, and PE91 which are smallest in size in the electrode groups EG1, EG5, and EG9. The relay line RL12 electrically connects the middle-sized pixel electrodes PE12, PE52, and PE92 of the electrode groups EG1, EG5, and EG9. The relay line RL13 electrically connects the largest pixel electrodes PE13, PE53, and PE93 of the electrode groups EG1, EG5, and EG9.

An electrode group EG6 disposed between the electrode groups EG1 and EG5 overlaps the line groups LG1 in a plan view while the insulating film 14 is disposed between the line group LG1 and the electrode group LG1 in the third direction Z. Furthermore, the upper connectors CTb of the electrode group EG6 are apart from the line group LG1. Thus, the electrode group EG6 is electrically isolated from the line group LG1. An electrode group EG10 disposed between the electrode groups EG5 and EG9 overlaps the line group LG1 and is electrically isolated from the line group LG1.

In this example, the advantages obtained in the example of the embodiment 1 can be achieved as well. Furthermore, the relay lines RL are disposed between the insulating film 13 and the insulating film 14, and the line group LG1 electrically connects the electrode group EG1 and the electrode group EG5 while overlapping the electrode group EG6 disposed between the electrode groups EG1 and EG5 in a plan view without electrical connection therebetween. That is, even the electrode groups EG disposed at intervals can hold modulation data for the image display while being electrically connected. Furthermore, the electrode groups EG1 and EG5 are opposed to a color filter of the same color as the color filter CF1, and the electrode group EG6 is opposed to a color filter of a different color from the color filter CF1. That is, the color display can be achieved equally in the main pixels PX2 and PX3 which overlap the driver DR as in the main pixel PX1.

[Variation 2]

FIG. 20 is a plan view of the structure of the main pixels PX1 to PX3 in a variation 2 of the embodiment 2.

In this variation, the areas of the main pixels PX2 and PX3 are different from the area of the main pixel PX1 in a plan view, and in this respect, the structure of the variation 2 differs from the structure of FIG. 15.

When the main pixels PX2 and PX3 overlapping the driver DR are compared to the main pixel PX1 which is apart from the driver DR, the widths of the main pixels PX1 to PX3 are, for example, equal to each other. The main pixel PX1 has a width in the first direction X which is a pitch PT1, the main pixel PX2 has a width in the first direction X which is a pitch PT2, and the main pixel PX3 has a width in the first direction X which is a pitch PT3. The pitches PT2 and PT3 are different from the pitch PT1 in size, and in the example depicted, the pitches PT2 and PT3 are equal to each other and are greater than the pitch PT1.

In this variation, the area where main pixels PX overlap the driver DR can be adjusted. Furthermore, the number of main pixels PX disposed to overlap the driver DR can be decreased.

[Variation 3]

Figure 21:
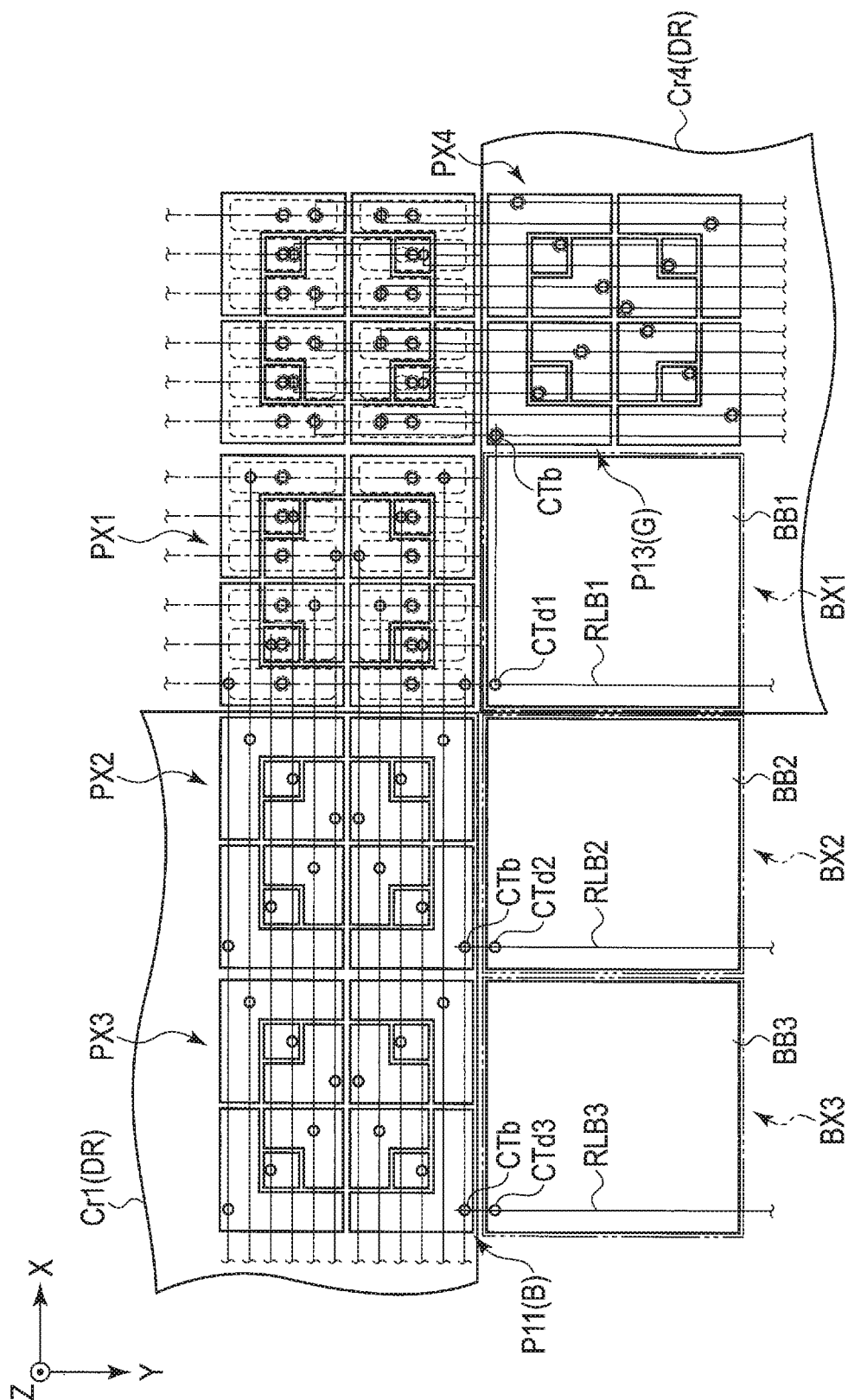
FIG. 21 is a plan view showing the structure of main pixels PX1 to PX3 and pixel blocks BX1 to BX3 of a variation 3 of the embodiment 2.

FIG. 21 is a plan view showing the structure of main pixels PX1 to PX3 and pixel blocks BX1 to BX3 in a variation 3 of the embodiment 2.

In this variation, block electrodes BB1 to BB3 and relay lines RLB1 to RLB3 are disposed therein, and in this respect, the structure of the variation 3 differs from the structure of FIG. 15.

Pixel blocks BX1 to BX3 are adjacent to main pixels PX1 to PX3 in the second direction Y, respectively, and are arranged in the first direction X. The pixel block BX1 is closer to the outer edge DAX than is the main pixel PX4, the pixel block BX2 is closer to the outer edge DAX than is the pixel block BX1, and the pixel block BX3 is closer to the outer edge DAX than is the pixel block BX2. The areas of the pixel blocks BX1 to BX3 used for the image display have substantially the same shape as the areas of the main pixels PX1 to PX4 used for the image display. The block electrodes BB1 to BB3 are disposed over the entire area used for the image display in the pixel blocks BX1 to BX3. That is, the areas of the block electrodes BB1 to BB3 are greater than any area of pixel electrodes PE of the electrode groups EG.

The relay lines RLB1 to RLB3 overlap the block electrodes BB1 to BB3, respectively. The relay line RLB1 crosses and is electrically connected to the relay line which is closest to the pixel block BX1 of the relay lines RL disposed in the main pixel PX4. The relay line RLB2 crosses and is electrically connected to the relay line which is closest to the pixel block BX2 of the relay lines RL disposed in the main pixel PX2. The relay line RLB3 crosses and is electrically connected to the relay line which is closest to the pixel block BX3 of the relay lines RL disposed in the main pixel PX3. In the example depicted, the relay lines RLB1 to RLB3 cross the relay lines RL with the upper connectors CTb.

The areas corresponding to the block electrodes BB1 to BB3 include upper connectors CTd1 to CTd3. The upper connectors CTd penetrate the insulating film 14 as with the upper connectors CTb. The relay line RLB1 and the block electrode BB1 are electrically connected through the upper connector CTd1. The relay line RLB1 and the block electrode BB1 are electrically connected through the upper connector CTd1. The relay line RLB2 and the block electrode BB2 are electrically connected through the upper connector CTd2. The relay line RLB3 and the block electrode BB3 are electrically connected through the upper connector CTd3. That is, the block electrode BB1 is driven in synchronization with one of the pixel electrodes PE disposed in the main pixel PX4. Furthermore, the block electrodes BB2 and BB3 are driven in synchronization with one of the pixel electrodes PE disposed in the main pixel PX1. Pixel electrodes PE to which the block electrodes BB1 to BB3 are electrically connected are not limited, and, for example, the block electrodes BB1 to BB3 are all electrically connected to one pixel electrode PE and driven in synchronization with one pixel circuit PC.

The variation 3 can achieve the advantages obtained in the variation of the embodiment 1 of FIG. 14.

Embodiment 3

In this embodiment, an example of the application of the display device DSP of the embodiments 1 and 2 will be explained.

FIG. 22 shows an example of the structure of a multidisplay system.

The multidisplay system includes an image signal output device VD and display devices DSP1 to DSP4. The image signal output device VD is connected to the display devices DSP1 to DSP4 through cables. Each of the display devices DSP1 to DSP4 is formed similarly with the above display device DSP of the embodiments. Each of the display devices DSP1 to DSP4 includes display areas DA1 to DA4 and mounts MT1 to MT4.

In the example depicted, the display devices DSP1 to DSP4 are arranged such that the mounts MT thereof do not come between any adjacent display devices. That is, the display devices DSP1 and DSP2 are arranged in the first direction X, the display devices DSP3 and DSP4 are arranged in the first direction X, the display devices DSP1 and DSP3 are arranged in the second direction Y, and the display devices DSP2 and DSP4 are arranged in the second direction Y. Note that the display devices DSP1 and DSP3 are arranged such that display areas DA1 and DA3 thereof are adjacent to each other and mount MT1 to MT3 are not disposed between the display areas DA1 and DA3. Similarly, the display devices DSP2 and DSP4 are arranged such that display areas DA2 and DA4 thereof are adjacent to each other.

In such a structure, the display areas DA1 to DA4 of the display devices DSP1 to DSP4 are adjacent to each other in the proximity. Furthermore, as can be understood from the above, each of the display devices DSP1 to DSP4 has a thin bezel structure, gaps between adjacent display areas DA1 to DA4 can be decreased. Therefore, a cut in the displayed image in the display areas DA1 to DA4 can be less recognized, and the display quality can be improved.

As can be understood from the above, the present embodiment can provide a display device of thin bezel structure.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Examples of the display device achievable from the description of the present application will be mentioned as follows.

(1) A display device comprising:
a driver;
a pixel circuit disposed to be apart from the driver in a plan view and to be electrically connected to the driver;
a first pixel electrode disposed to overlap the pixel circuit in a plan view and to be electrically connected to the pixel circuit;
a second pixel electrode disposed to overlap the driver in a plan view and to be closer to an outer edge of a display area than the first pixel electrode; and
a relay line disposed between the pixel circuit and the first pixel electrode and between the driver and the second pixel electrode, the relay line electrically connecting the first pixel electrode and the second pixel electrode.

(2) The display device according to (1), further comprising:
a first insulating film disposed between the driver and the relay line and between the pixel circuit and the relay line;
a second insulating film disposed between the relay line and the first pixel electrode and between the relay line and the second pixel electrode;
a connector penetrating the first insulating film and the second insulating film to electrically connect the pixel circuit and the first pixel electrode;
a first upper connector penetrating the second insulating film, and disposed to be apart from the connector in a plan view and to electrically connect the relay line and the first pixel electrode; and
a second upper connector penetrating the second insulating film to electrically connect the relay line and the second pixel electrode.

(3) The display device according to (1), further comprising:
a third pixel electrode adjacent to the first pixel electrode, the third pixel electrode being more apart from the outer edge than the first pixel electrode; and
a light shield disposed to overlap a gap between the first pixel electrode and the third pixel electrode in a plan view.

(4) The display device according to (3), wherein an end of the light shield overlaps the first pixel electrode in a plan view; and
the light shield is disposed to be apart from the relay line, wherein the light shield and the relay line are disposed over the same layer.

(5) The display device according to (1), further comprising:
a first substrate; and
a second substrate disposed to be opposed to the first substrate, wherein
the first substrate includes the first pixel electrode, and
an anisotropy diffusion layer is disposed over the second substrate,
the anisotropy diffusion layer is opposed to the first pixel electrode,
the anisotropy diffusion layer is configured to diffuse incident light from a particular direction.

(6) The display device according to (1), further comprising:
a first substrate; and
a second substrate disposed to be opposed to the first substrate, wherein
the first substrate includes the first pixel electrode, and
an isotropy diffusion layer is disposed over the second substrate
the isotropy diffusion layer is opposed to the first pixel electrode,
the isotropy diffusion layer is configured to diffuse incident light from any direction.

(7) The display device according to (1), further comprising:
a fourth pixel electrode adjacent to the second pixel electrode in the direction crossing a direction in which the first pixel electrode and the second pixel electrode are arranged; and
a second relay line crossing the relay line to electrically connect the second pixel electrode and the fourth pixel electrode.

(8) A display device comprising:
a driver;
a circuit group including first to third pixel circuits each electrically connected to the driver, the circuit group disposed to be apart from the driver in a plan view;
a first electrode group including a first pixel electrode electrically connected to the first pixel circuit, a second pixel electrode electrically connected to the second pixel circuit and having an area which is greater than the area of the first pixel electrode, and a third pixel electrode electrically connected to the third pixel circuit and having an area which is greater than the area of the second pixel electrode, the first electrode group overlapping the circuit group in a plan view;
a second electrode group including a fourth pixel electrode, a fifth pixel electrode having an area which is greater than the area of the fourth pixel electrode, and a sixth pixel electrode having an area which is greater than the area of the fifth pixel electrode, the second electrode group overlapping the driver in a plan view and being closer to an outer edge of a display area than the first pixel electrode; and
a line group including first to third relay lines between the circuit group and the first electrode group and between the driver and the second electrode group, wherein
the first relay line electrically connect the first pixel electrode and the fourth pixel electrode,
the second relay line electrically connect the second pixel electrode and the fifth pixel electrode, and
the third relay line electrically connect the third pixel electrode and the sixth pixel electrode.

(9) The display device according to (8), further comprising:
a first color filter opposed to the first electrode group; and
a second color filter opposed to the second electrode group,
wherein the second color filter has the same color as the first color filter.

(10) The display device according to (8), further comprising:
a first insulating film disposed between the driver and the line group and between the circuit group and the line group;
a second insulating film disposed between the line group and the first electrode group and between the line group and the second electrode group;
a first connector penetrating the first and second insulating films to electrically connect the first pixel circuit and the first pixel electrode;
a second connector penetrating the first and second insulating films to electrically connect the second pixel circuit and the second pixel electrode;
a third connector penetrating the first and second insulating films to electrically connect the third pixel circuit and the third pixel electrode;
a first upper connector penetrating the second insulating film and disposed to be apart from the first connector in a plan view, the first upper connector electrically connecting the first relay line and the first pixel electrode;
a second upper connector penetrating the second insulating film and disposed to be part from the second connector in a plan view, the second upper connector electrically connecting the second relay line and the second pixel electrode; and
a third upper connector penetrating the second insulating film and disposed to be part from the third connector in a plan view, the third upper connector electrically connecting the third relay line and the third pixel electrode.

(11) The display device according to (8), further comprising a third electrode group disposed between the first electrode group and the second electrode group, wherein
the third electrode group overlaps the line group,
the third electrode group is apart from the line group in a plan view.

(12) The display device according to (11), further comprising:
a first color filter opposed to the first electrode group;
a second color filter opposed to the second electrode group; and
a third color filter opposed to the third electrode group, wherein
the second color filter has the same color as the first color filter,
the third color filter has a different color from the first color filter.

(13) The display device according to (8), wherein
the first and second electrode groups are arranged in a first direction, and
the first electrode group has a first width in the first direction,
the second electrode group has a second width in the first direction,
the second width is greater than the first width.

(14) The display device according to (8), further comprising:
a fourth electrode group adjacent to the first electrode group and being apart from the outer edge than the first electrode group; and
a light shield disposed to overlap a gap between the first electrode group and the fourth electrode group in a plan view.

(15) The display device according to (14), wherein
an end of the light shield overlaps the first electrode group in a plan view, and
the light shield is disposed to be part from the line group
the light shield and the relay line are disposed over the same layer.

(16) The display device of (8), further comprising:
a first substrate; and
a second substrate disposed to be opposed to the first substrate, wherein
the first substrate includes the first pixel electrode, and
an anisotropy diffusion layer is disposed over the second substrate
the anisotropy diffusion layer is opposed to the first pixel electrode, the anisotropy diffusion layer is configured to diffuse incident light from a particular direction.

(17) The display device according to (8), further comprising:
a first substrate; and
a second substrate disposed to be opposed to the first substrate, wherein
the first substrate includes the first pixel electrode, and
an isotropy diffusion layer is disposed over the second substrate
the isotropy diffusion layer is opposed to the first pixel electrode,
the isotropy diffusion layer is configured to diffuse incident light from any direction.

(18) The display device according to (8), wherein
the first electrode group is included in a first main pixel,
the second electrode group is included in a second main pixel which is adjacent to the first main pixel in a first direction,
the display device further comprising:
a pixel block which is adjacent to the second main pixel in a second direction crossing the first direction, the pixel block having an area which is equal to the area of the second main pixel for image display;
a block electrode arranged over the entire surface of the pixel block; and
a fourth relay line crossing a relay line closest to the pixel block among a plurality of relay lines overlapping the second main pixel,
wherein the fourth relay line is configured to electrically connect the relay line of the second main pixel and the block electrode.

What is claimed is:

1. A display device comprising:
a peripheral circuit;
pixel circuits disposed to be apart from the peripheral circuit in a plan view and to be electrically connected to the peripheral circuit;
a first pixel electrode disposed to overlap one of the pixel circuit in a plan view and to be electrically connected to the pixel circuit;
a second pixel electrode disposed so as not to overlap any of those pixel circuits in a plan view, and a distance between the second pixel electrode and an outer edge of a display area is smaller than a distance between the first pixel electrode and the outer edge of the display area;
a connecting line disposed between the pixel circuit and the first pixel electrode and between the peripheral circuit and the second pixel electrode, the connecting line electrically connecting the first pixel electrode and the second pixel electrode.

2. The display device according to claim 1, wherein
the display device is a reflective liquid crystal display device.

3. The display device according to claim 1, further comprising:
a first insulating film disposed between the peripheral circuit and the connecting line and between the pixel circuit and the connecting line;
a second insulating film disposed between the connecting line and the first pixel electrode and between the connecting line and the second pixel electrode;
a connector penetrating the first insulating film and the second insulating film electrically connect the pixel circuit and the first pixel electrode;
a first upper connector penetrating the second insulating film, and disposed to be apart from the connector in a plan view and to electrically connect the connecting line and the first pixel electrode; and
a second upper connector penetrating the second insulating film to electrically connect the connecting line and the second pixel electrode.

4. The display device according to claim 1, further comprising:
a first substrate; and
a second substrate disposed to be opposed to the first substrate, wherein
the first substrate includes the first pixel electrode,
an anisotropy diffusion layer is disposed over the second substrate,
the anisotropy diffusion layer is opposed to the first pixel electrode, and
the anisotropy diffusion layer is configured to diffuse incident light from a particular direction.

5. The display device according to claim 1, further comprising:
a first substrate; and
a second substrate disposed to be opposed to the first substrate, wherein
the first substrate includes the first pixel electrode,
an isotropy diffusion layer is disposed over the second substrate,
the isotropy diffusion layer is opposed to the first pixel electrode, and
the isotropy diffusion layer is configured to diffuse incident light from any direction.

6. The display device according to claim 2, wherein
the first pixel electrode includes a reflection electrode and a transparent electrode,
the transparent electrode covers the reflection electrode,
the reflection electrode is formed of a light reflective metal material, and
the transparent electrode is formed of a light transmissive transparent conductive material.

* * * * *